US010992831B2

(12) United States Patent
Zhang

(10) Patent No.: US 10,992,831 B2
(45) Date of Patent: Apr. 27, 2021

(54) INFORMATION PROCESSING SYSTEM FOR SETTING DEPENDENCY RELATIONSHIPS FOR INPUT ITEMS ON A SCREEN RELATED TO A PROCESS FLOW

(71) Applicant: Dongzhe Zhang, Kanagawa (JP)

(72) Inventor: Dongzhe Zhang, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/718,572

(22) Filed: Dec. 18, 2019

(65) Prior Publication Data

US 2020/0204693 A1    Jun. 25, 2020

(30) Foreign Application Priority Data

Dec. 25, 2018  (JP) .............................. JP2018-241836

(51) Int. Cl.
*G06F 3/12* (2006.01)
*H04N 1/00* (2006.01)

(52) U.S. Cl.
CPC ..... *H04N 1/00416* (2013.01); *H04N 1/00225* (2013.01); *H04N 1/00474* (2013.01); *H04N 1/00962* (2013.01); *H04N 2201/0094* (2013.01)

(58) Field of Classification Search
None
See application file for complete search history.

(56) References Cited

U.S. PATENT DOCUMENTS 10,306,080 B2 *  5/2019  Uchibori .............. H04L 63/104
10,445,489 B2 * 10/2019  Hayashi ................. G06F 21/31
10,750,044 B2 *  8/2020  Hayashi .............. H04N 1/00949
2016/0241724 A1 *  8/2016  Sugimura ........... H04N 1/00962
2017/0109194 A1 *  4/2017  Namihira ............. G06F 9/45512
2018/0013913 A1    1/2018  Hayashi et al.
2018/0349078 A1   12/2018  Yoshihashi
2019/0289157 A1    9/2019  Zhang et al.

FOREIGN PATENT DOCUMENTS

JP       5-046338     2/1993
JP    2018-014079    1/2018

OTHER PUBLICATIONS

Extended European Search Report dated May 19, 2020, in Patent Application No. 19216719.5, 9 pages.

* cited by examiner

*Primary Examiner* — Henok Shiferaw
(74) *Attorney, Agent, or Firm* — Oblon, McClelland, Maier & Neustadt, L.L.P.

(57) ABSTRACT

An information processing system includes a plurality of programs each executing a predetermined process. The information processing system includes a memory that stores an application for executing a series of processes. The memory further stores use screen information. The information processing system further includes circuitry configured to: receive a display request for the use screen from an electronic device; transmit, to the electronic device, the use screen information defining the use screen requested by the received display request and the setting information for the application corresponding to the use screen information; receive, from the electronic device, a first acquisition request that includes a first item detail that is input to a first input item among the input items on the use screen; acquire, from the external service, list information; and transmit the acquired list information to the electronic device.

9 Claims, 32 Drawing Sheets

FORMAT CONVERSION INFORMATION TABLE  ⌐4000

| DATA FORMAT BEFORE CONVERSION | DATA FORMAT AFTER CONVERSION | FORMAT CONVERSION TO BE GENERATED |
|---|---|---|
| InputStream | LocalFilePath | FIRST FORMAT CONVERSION |
| LocalFilePath | File | SECOND FORMAT CONVERSION |
| ... | ... | ... |

FIG. 10

APPLICATION REGISTRATION

| TYPE SELECTION | BASIC SETTING | DETAILED SETTING | REGISTRATION |

PLEASE SELECT APPLICATION TYPE

G210 — PRINT TYPE
G220 — SCAN TYPE

G230 — DESCRIPTION: .....

RETURN | NEXT | REGISTER | CANCEL

APPLICATION REGISTRATION

| TYPE SELECTION | BASIC SETTING | DETAILED SETTING | REGISTRATION |

PLEASE INPUT BASIC INFORMATION ON APPLICATION

TYPE: SCAN WORK FLOW

APPLICATION NAME: SCAN TRANSLATION APPLICATION  ~G310

DESIGN TEMPLATE: SINGLE SCREEN FORMAT ▼  ~G320

AUTHENTICATION: NONE ▼ ~G330

DISPLAY LANGUAGE: English, Japanese ▼ ~G340

☑ English
☑ Japanese
☐ Chinese

[ RETURN ] [ NEXT ] [ REGISTER ] [ CANCEL ]

APPLICATION REGISTRATION — G600

| TYPE SELECTION | BASIC SETTING | DETAILED SETTING | REGISTRATION |

PLEASE CONFIRM SET APPLICATION INFORMATION

G610:
- Title: SCAN TRANSLATION APPLICATION
- Description:
- Target flow: translate-mail
- Application view:
  - parameters
    - ...

[ RETURN ]  [ NEXT ]  [ REGISTER ]  [ CANCEL ]

```
                                                              ┌1200
┌─────────────────────────────────────────────────────────┐
│   "app_type" : "scan",          }1201                   │
│   "appName" : "SCAN TRANSLATION APPLICATION",  }1202    │
│  ┌─────────────────────────────────────────┐            │
│  │ "displayName" : {                        │            │
│  │   "Japanese" :"スキャン翻訳",              │──1203     │
│  │   "English" :"Translation App"           │            │
│  │ },                                       │            │
│  └─────────────────────────────────────────┘            │
│   "loginType" : "none",         }1204                   │
│   "flowName" : "translate-mail",  }1205                 │
│   "viewTemplate" : "SINGLE SCREEN FORMAT",  }1206       │
│  ┌─────────────────────────────────────────┐            │
│  │ "defaultParameters" : {                  │            │
│  │   "detail0 " : {                         │──1207     │
│  │     "language" : "English",              │            │
│  │   },                                     │            │
│  └─────────────────────────────────────────┘            │
│  ┌─────────────────────────────────────────┐            │
│  │ "userInputParameters" : {                │            │
│  │   "detail1": [                           │──1208     │
│  │    {                                     │            │
│  │     "name" : "from"            ⎫         │            │
│  │     "displayName" :{           ⎪         │            │
│  │       "Japanese" :"翻訳元",      ⎬1218    │            │
│  │       "English" : "Source Language"⎪    │            │
│  │     },                         ⎪         │            │
│  │     "inputType :"list-radio-button" ⎭   │            │
│  │    },                                    │            │
│  │    {                                     │            │
│  │     "name" : "to"              ⎫         │            │
│  │     "displayName" :{           ⎪         │            │
│  │       "Japanese" :"翻訳先",      ⎬1228    │            │
│  │       "English" : "Target Language"⎪    │            │
│  │     },                         ⎪         │            │
│  │     "inputType :"list-radio-button" ⎭   │            │
│  │    }                                     │            │
│  │   ],                                     │            │
│  │   "detail2" :[                           │            │
│  │     "name" : "address"         ⎫         │            │
│  │     "displayName" :{           ⎪         │            │
│  │       "Japanese" :"メール送信先",  ⎬1238   │            │
│  │       "English" : "Mail Recipient",⎪    │            │
│  │     },                         ⎪         │            │
│  │     "inputType :"text"         ⎭         │            │
│  │   ]                                      │            │
│  │ }                                        │            │
│  └─────────────────────────────────────────┘            │
└─────────────────────────────────────────────────────────┘
```

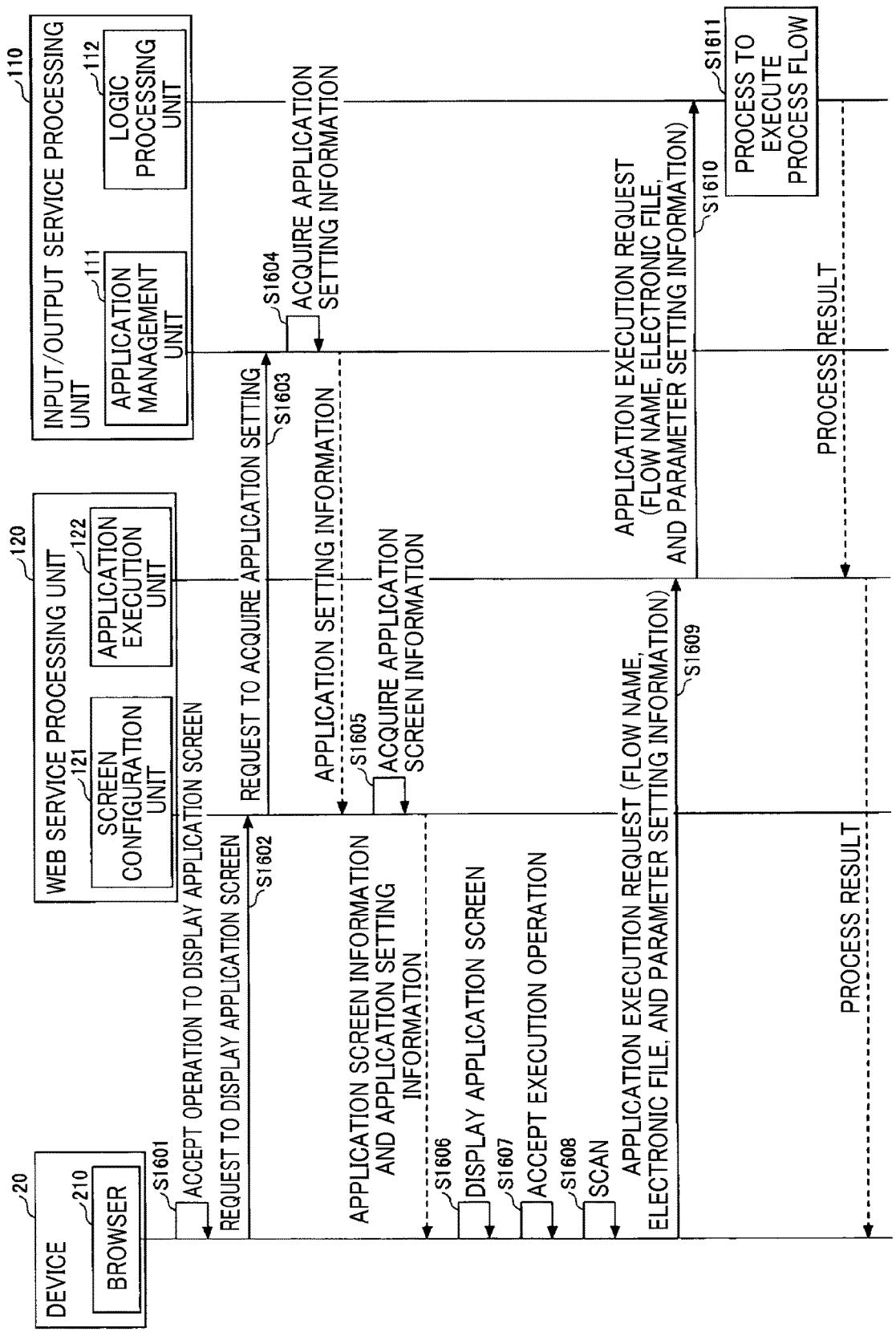

FIG. 21

PROCESS FLOW REGISTRATION

[PORTAL] [ADD] [COPY] [DELETE]

| PROCESS FLOW NAME | TYPE | DESCRIPTION | REGISTRATION DATE AND TIME |
|---|---|---|---|
| Test-flow | select | A test data source flow by using the original component. | 2018/10/26 09:05:42 |
| DataSource | select |  | 2018/10/25 20:21:12 |
| Test1 | select | Test for datasource. | 2018/10/17 21:19:24 |
| translate-mail | select |  | 2018/10/17 20:58:26 |

PLEASE SET OPTION

○ CUSTOM
● EXTERNAL DATA SOURCE

EXTERNAL DATA SOURCE SETTING     G1731

| DOCUMENT LIST ▽ |

REGULAR CUSTOMER

| REFERRING TO 'customerName' |    | CANCEL REFERENCE SETTING |
G1732                                G1733

CASE NAME

| REFERRING TO 'caseName' |    | CANCEL REFERENCE SETTING |
G1734                              G1735

[+]
G1736

G1737

| SET |  | CANCEL |

US 10,992,831 B2

INFORMATION PROCESSING SYSTEM FOR SETTING DEPENDENCY RELATIONSHIPS FOR INPUT ITEMS ON A SCREEN RELATED TO A PROCESS FLOW

CROSS-REFERENCE TO RELATED APPLICATION

This patent application is based on and claims priority pursuant to 35 U.S.C. § 119(a) to Japanese Patent Application No. 2018-241836, filed on Dec. 25, 2018, in the Japan Patent Office, the entire disclosure of which is hereby incorporated by reference herein.

BACKGROUND

Technical Field

The present disclosure relates to an information processing system, an information processing apparatus, and an information processing method.

Description of the Related Art

In recent years, there are known services for providing functions that combine multiple functions (e.g., scanning, printing, and e-mail delivery). For example, there is a service for e-mail delivery after a predetermined process is performed on an electronic file (image file) generated through scanning. Furthermore, for example, there is a service for printing after a document selected by the user is acquired from an external unit. One or more processes for performing each function are executed as a series of processes to perform the above-described type of service.

There is a related art in which, in a case where there are multiple input fields to select items in association with the selection operation for acquiring an external document to be printed as described above, the items related to the item selected in a specific input field are displayed as a list in another input field by using a pull-down menu.

SUMMARY

According to an embodiment, an information processing system includes a plurality of programs each executing a predetermined process. The information processing system includes a memory that stores an application for executing a series of processes, the application associating process flow information defining an execution order of one or more program of the plurality of programs with setting information for setting a parameter used to execute to each of the one or more programs, and use screen information defining a use screen for using the application. The information processing system further includes circuitry configured to: receive a display request for the use screen from an electronic device; transmit, to the electronic device, the use screen information defining the use screen requested by the received display request and the setting information for the application corresponding to the use screen information, the setting information including setting of a dependency relationship between input items on the use screen and a reference setting of the input items to an external service; receive, from the electronic device, a first acquisition request that includes a first item detail that is input to a first input item among the input items on the use screen based on the transmitted use screen information, the first acquisition request requesting acquisition of a candidate for a second input item which is a dependency source and for which the first input item is set as a dependency target; acquire, from the external service, list information of the candidate for the second input item associated with the first item detail included in the first acquisition request; and transmit the acquired list information to the electronic device to allow a candidate included in the list information to be selectable as the candidate for the second input item on the use screen displayed on the electronic device.

BRIEF DESCRIPTION OF THE SEVERAL VIEWS OF THE DRAWINGS

A more complete appreciation of the disclosure and many of the attendant advantages and features thereof may be readily obtained and understood from the following detailed description with reference to the accompanying drawings, wherein:

FIG. 10 is a diagram illustrating an application registration screen (1/5), according to the first embodiment;

FIG. 11 is a diagram illustrating the application registration screen (2/5), according to the first embodiment;

FIG. 14 is a diagram illustrating the application registration screen (5/5), according to the first embodiment;

FIG. 15 is a diagram illustrating an example of application setting information, according to the first embodiment;

FIG. 16 is a sequence diagram illustrating an example of an overall process that is performed when using a scan translation service, according to the first embodiment;

FIG. 21 is a diagram illustrating an example of a process flow registration screen, according to the second embodiment;

FIG. 31 is a diagram illustrating an example of the external data source setting screen on which a reference setting is configured, according to the second embodiment;

Figure 1:
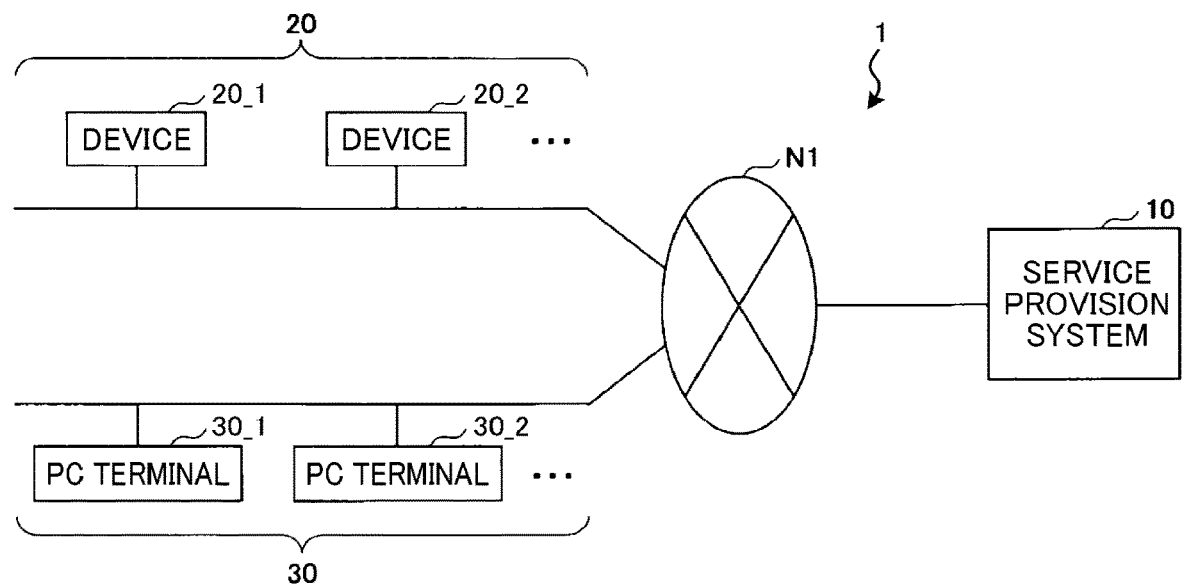
FIG. 1 is a diagram illustrating an example of the system configuration of an information processing system, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, an information processing system, an information processing apparatus, an information processing method, and a program according to an embodiment of the present disclosure are described below in detail.

First Embodiment

Configuration of Information Processing System

FIG. 1 is a diagram illustrating an example of the system configuration of an information processing system 1 according to a first embodiment of the present disclosure. Referring to FIG. 1, the system configuration of the information processing system 1 according to the present embodiment is described.

The information processing system 1 illustrated in FIG. 1 includes a service provision system 10, a device 20, and a personal computer (PC) terminal 30. The service provision system 10, the device 20, and the PC terminal 30 are communicatively connected to one another via a wide area network N1, such as the Internet.

The service provision system 10 is implemented by using one or more information processing apparatuses. The service provision system 10 provides, via the network N1, various services performed by a series of processes combining one or more processes among the processes for performing various functions.

The functions refer to the functions related to electronic files, such as document files and image files. Examples of the functions include printing, scanning, facsimile transmission, data format conversion, e-mail delivery, optical character recognition (OCR) processing, modification, compression/decompression, and storage in a repository.

A specific example of the service provided by the service provision system 10 according to the present embodiment is described later. Hereinafter, the series of processes is also referred to as a "process flow".

The device 20 is various electronic devices used by a user. The device 20 is, for example, an image forming apparatus such as a multifunction peripheral (MFP), a projector (PJ), an interactive whiteboard (IWB) (an electronic whiteboard functioning as a blackboard and enabling the mutual communication), an output device such as a digital signage, a head-up display (HUD) device, an industrial machine, an imaging device, a sound collector, a medical device, a network home appliance, a laptop PC, a mobile phone, a smartphone, a tablet terminal, a game machine, a personal digital assistant (PDA), a digital camera, a wearable PC, or a desktop PC. Various services provided by the service provision system 10 are available to users through the use of the device 20.

Hereinafter, if a plurality of devices 20 are to be distinguished from each other, the devices 20 are referred to with indexes, such as "a device 20_1," "a device 20_2," and so forth.

The PC terminal 30 is, for example, a notebook PC, a mobile phone, a smartphone, a tablet terminal, a PDA, a wearable PC, or a desktop PC. Various services provided by the service provision system 10 are available to users through the use of the PC terminal 30.

Hereinafter, if a plurality of PC terminals 30 are to be distinguished from each other, the PC terminals 30 are referred to with indexes, such as "a PC terminal 30_1," "a PC terminal 30_2," and so forth.

The configuration of the information processing system 1 illustrated in FIG. 1 is an example, and the information processing system 1 may have other configurations. For example, the information processing system 1 according to the present embodiment may include various devices that perform at least one of input and output of electronic data and use various services provided by the service provision system 10.

Hardware Configuration of the Service Provision System and the PC Terminal

Figure 2:
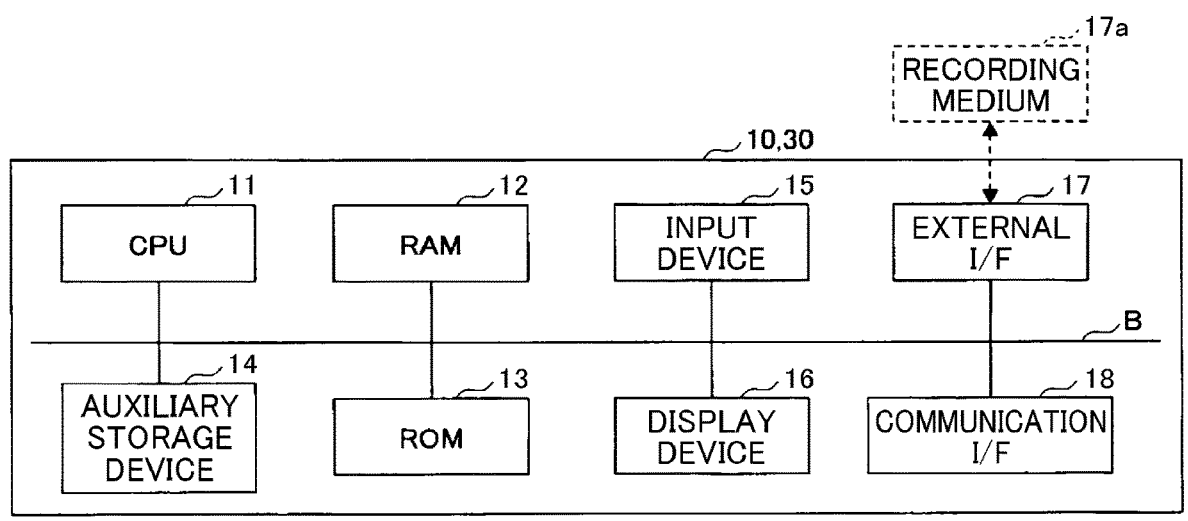
FIG. 2 is a diagram illustrating an example of the hardware configuration of a service provision system and a personal computer (PC) terminal, according to the first embodiment.

FIG. 2 is a diagram illustrating an example of the hardware configuration of the service provision system 10 and the PC terminal 30 according to the first embodiment. Referring to FIG. 2, the hardware configuration of the service provision system 10 and the PC terminal 30 included in the information processing system 1 according to the present embodiment is described. As the service provision system 10 and the PC terminal 30 have the same hardware configuration, the hardware of the service provision system 10 is primarily described below.

The service provision system 10 illustrated in FIG. 2 includes a central processing unit (CPU) 11, a random access memory (RAM) 12, a read only memory (ROM) 13, an auxiliary storage device 14, an input device 15, a display device 16, an external I/F 17, and a communication I/F 18. Each of these pieces of hardware is coupled via a bus B.

The CPU 11 is an arithmetic device that reads programs and data from a storage device, such as the ROM 13 or the auxiliary storage device 14, onto the RAM 12 and executes processes to perform control on the overall service provision system 10 and perform the functions of the service provision system 10.

The RAM 12 is a volatile semiconductor memory that temporarily stores programs and data. The ROM 13 is a nonvolatile semiconductor memory that may retain programs and data even when the power is off. The ROM 13 stores programs and data such as the Basic Input/Output System (BIOS), OS settings, and network settings, which are executed when the service provision system 10 is started up.

The auxiliary storage device 14 is a nonvolatile storage device that stores programs and data. The auxiliary storage device 14 is a hard disk drive (HDD), a solid state drive (SSD), etc. The programs and data stored in the auxiliary storage device 14 include, for example, the operating system (OS) that is the basic software for controlling the overall service provision system 10, or application software for providing various functions in the OS. The auxiliary storage device 14 manages the stored programs and data with a predetermined file system, database, etc.

The input device 15 includes a keyboard, a mouse, a touch panel, etc. The input device 15 is used by the user to input various control signals. The display device 16 includes a display, etc., to display processing results obtained by the service provision system 10. The display device 16 is, for example, a liquid crystal display (LCD) or an organic electro-luminescence (EL) display. At least one of the input device 15 and the display device 16 may be configured to be coupled to the service provision system 10 while in use as appropriate.

The external I/F 17 is an interface with an external device. Examples of the external device include a recording medium 17a. The service provision system 10 may read and write data from and in the recording medium 17a via the external IN 17. Examples of the recording medium 17a include a flexible disk, a compact disc (CD), a digital versatile disc (DVD), a secure digital (SD) memory card, or a universal serial bus (USB) memory.

The communication I/F 18 is an interface that connects the service provision system 10 to the network N1. The communication I/F 18 is an interface that is compatible with, for example, Ethernet (registered trademark) and that enables the communication based on Transmission Control Protocol (TCP)/Internet Protocol (IP). The service provision system 10 may perform communications via the communication I/F 18.

Instead of the auxiliary storage device 14, the service provision system 10 may use a drive device (e.g., a solid state drive (SSD)) that uses a flash memory as a storage medium.

The service provision system 10 and the PC terminal 30 according to the present embodiment have the hardware configuration illustrated in FIG. 2 so as to perform various processes as described later.

Hardware Configuration of the Device

Figure 3:
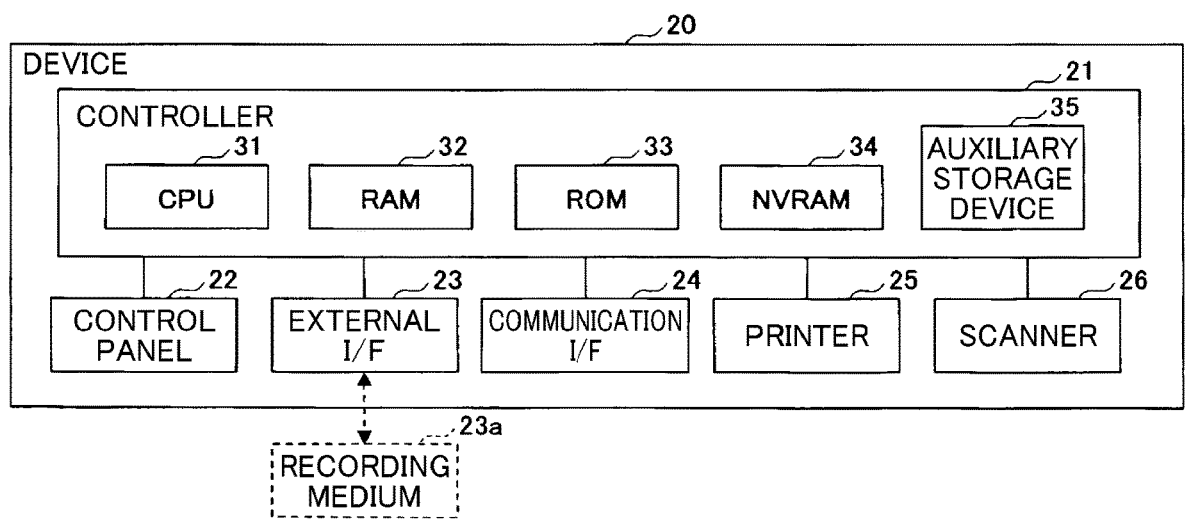
FIG. 3 is a diagram illustrating an example of the hardware configuration of a device, according to the first embodiment.

FIG. 3 is a diagram illustrating an example of the hardware configuration of the device 20 according to the first embodiment. Referring to FIG. 3, the hardware configuration of the device 20 included in the information processing system 1 according to the present embodiment in a case where the device 20 is an image forming apparatus is described.

The device 20 illustrated in FIG. 3 includes a controller 21, a control panel 22, an external I/F 23, a communication I/F 24, a printer 25, and a scanner 26. The controller 21 includes a CPU 31, a RAM 32, a ROM 33, a nonvolatile RAM (NVRAM) 34, and an auxiliary storage device 35.

The CPU 31 is an arithmetic device that reads programs, data, setting information, etc., from the ROM 33, the NVRAM 34, the auxiliary storage device 35, etc., onto the RAM 32 and executes processes to perform control on the overall device 20 and perform the functions of the device 20.

The RAM 32 is a volatile semiconductor memory that temporarily stores programs and data. The ROM 33 is a nonvolatile semiconductor memory that stores various programs and data. The NVRAM 34 stores, for example, setting information. The auxiliary storage device 35 is a nonvolatile storage device that stores various types of programs and data. The auxiliary storage device 35 is an HDD, an SSD, etc.

The control panel 22 includes an input unit that accepts input from the user and a display unit that conducts display. The control panel 22 includes, for example, a liquid crystal display device (LCD) provided with a touch panel function. The control panel 22 is not limited to the liquid crystal display device and may include, for example, an organic EL display device provided with a touch panel function. The control panel 22 may include a control unit, such as a hardware key, or a display unit, such as a lamp, in addition to the touch panel function or in place of the touch panel function.

The external I/F 23 is an interface with an external device. Examples of the external device include a recording medium 23a. The device 20 may read and write data from and in the recording medium 23a through the external I/F 23. The recording medium 23a is, for example, an IC card, a flexible disk, a CD, a DVD, an SD memory card, or a USB memory.

The communication I/F 24 is an interface that connects the device 20 to a network. The communication I/F 24 is an interface that is compatible with, for example, Ethernet and that enables the communication based on TCP/IP, etc. The device 20 may perform communications via the communication i/F 24.

The printer 25 is a printing device that prints out print data. The scanner 26 is a reading device that reads a document and generates an electronic file (image file).

The device 20 according to the present embodiment has the hardware configuration illustrated in FIG. 3 to perform various functions described later.

Service Provided by the Service Provision System

Here, a service provided by the service provision system 10 according to the present embodiment is described. In the following description, it is assumed that the device 20 is an MFP.

According to the present embodiment, the service for e-mail delivery after OCR processing on an electronic file (image file) generated by scanning a document with the device 20 and the translation into a predetermined language is referred to as "scan translation service". In the present embodiment, a case where the service provision system 10 provides the scan translation service is described.

In order for the service provision system 10 to provide the scan translation service, the application (application information 1000 described later) for the device 20 to use the scan translation service is required to be registered in the service provision system 10.

In the present embodiment, a case where the PC terminal 30 registers the application for using the scan translation service and a case where the device 20 uses the scan translation service using the application are described.

The service provided by the service provision system 10 is not limited to the above. The service provision system 10 may provide, for example, the service for e-mail delivery after the encryption on an electronic file generated by scanning a document with the device 20. The service provision system 10 may provide, for example, the service for fax transmission after the addition of predetermined information to an electronic file generated by scanning a document with the device 20.

Functional Configuration of the Information Processing System

Figure 4:
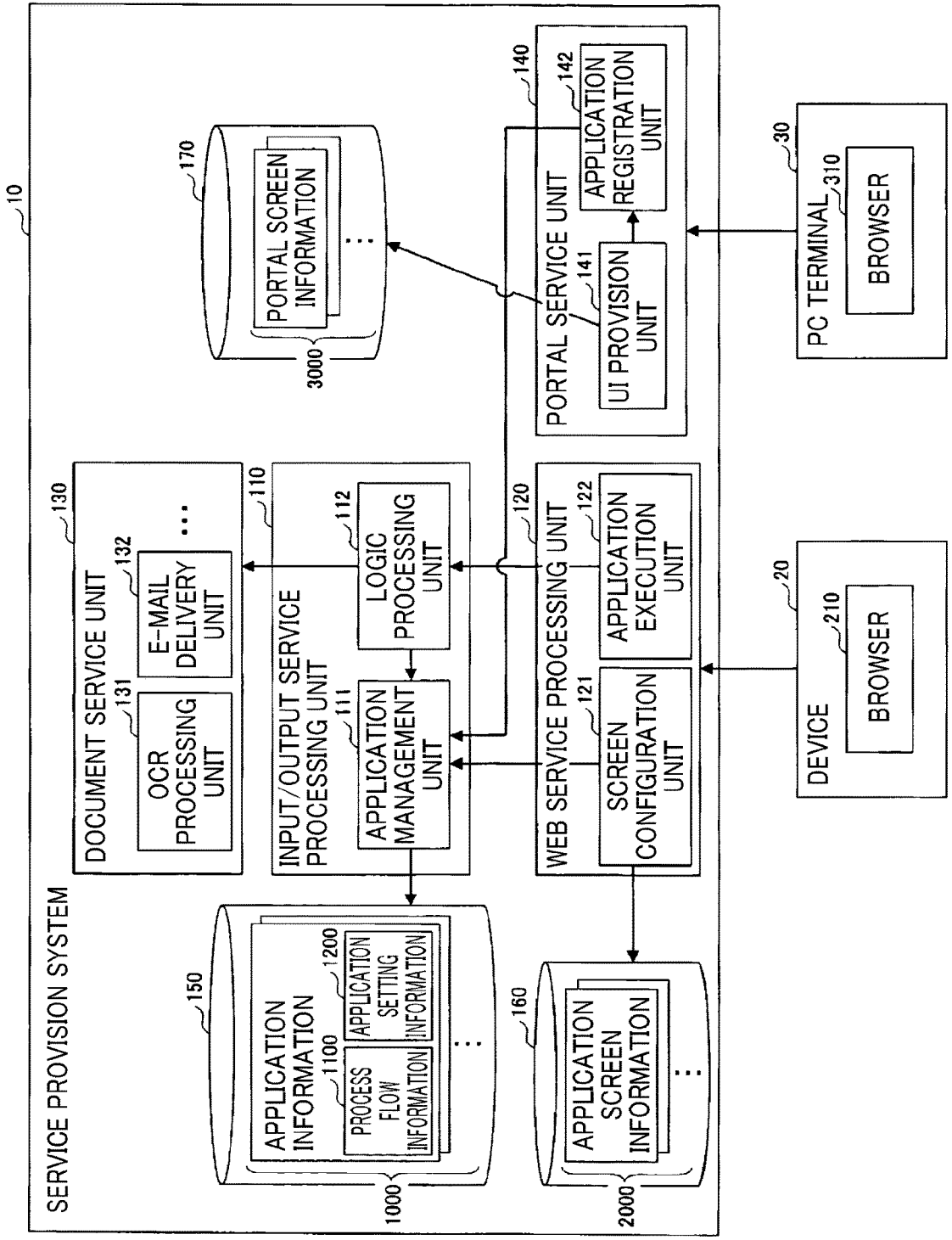
FIG. 4 is a diagram illustrating an example of the functional configuration of the information processing system, according to the first embodiment.

FIG. 4 is a diagram illustrating an example of the functional configuration of the information processing system 1 according to the first embodiment. Referring to FIG. 4, the functional configuration of the information processing system 1 according to the present embodiment is described.

The PC terminal 30 illustrated in FIG. 4 includes, for example, a browser 310 executed by the CPU 11. The user of the PC terminal 30 may use the browser 310 to register the application for using various services, such as "scan translation service", in the service provision system 10.

The device 20 illustrated in FIG. 4 includes, for example, a browser 210 executed by the CPU 31. The user of the device 20 may use the browser 210 to use various services, such as "scan translation service". That is, the device 20 may omit, for example, a dedicated application program for using various services provided by the service provision system 10 as long as the device 20 includes the browser 210.

The service provision system 10 illustrated in FIG. 4 includes an input/output service processing unit 110, a web service processing unit 120, a document service unit 130, and a portal service unit 140. Each of these functional units is implemented by the process executed by the CPU 11 due to one or more programs installed in the service provision system 10.

The service provision system 10 includes an application information storage unit 150, an application screen information storage unit 160, and a portal screen information storage unit 170. These storage units may be implemented by using the auxiliary storage device 14. At least one of these storage units may be implemented by using a storage device, or the like, connected via the service provision system 10 and a network.

The I/O service processing unit 110 performs processing regarding a service provided by the service provision system 10. The I/O service processing unit 110 includes an application management unit 111 and a logic processing unit 112.

The application management unit 111 manages the application information 1000 stored in the application information storage unit 150. The application information 1000 is the information on the application for using a service implemented by a series of processes. In other words, various services provided by the service provision system 10 are provided by the application information 1000.

The application management unit 111 returns process flow information 1100 included in the application information 1000 in response to a request from the logic processing unit 112. The process flow information 1100 is information that defines a series of processes for performing a service provided by the application information 1000.

The application management unit 111 causes the application information storage unit 150 to store the application information 1000 in response to a request from the portal service unit 140. Thus, the application information 1000 (application) for providing the service is registered in the service provision system 10.

In response to a request from the web service processing unit 120, the logic processing unit 112 acquires the process flow information 1100 included in the application information 1000 from the application management unit 111. The logic processing unit 112 executes a series of processes (process flow) for performing the service provided by the application information 1000 based on the process flow information 1100 acquired from the application management unit 111. This allows the service provision system 10 according to the present embodiment to provide various services such as "scan translation service". The logic processing unit 112 is described later in detail.

The web service processing unit 120 performs a process for the user to use various services by using the browser 210 of the device 20. That is, the web service processing unit 120 functions as an application server to provide the browser 210 with a web application (the application information 1000). The web service processing unit 120 includes a screen configuration unit 121 and an application execution unit 122.

In response to a request from the browser 210, the screen configuration unit 121 returns application screen information 2000 stored in the application screen information storage unit 160 and application setting information 1200 included in the application information 1000 stored in the application information storage unit 150.

The application screen information 2000 is information that defines a template of a screen (application screen) for using a service provided by the application information 1000. The application screen information 2000 is information that defines a template of the application screen with at least any of HyperText Markup Language (HTML), Extensible HyperText Markup Language (XHTML), Cascading Style Sheets (CSS), JavaScript (registered trademark), and the like.

The application setting information 1200 is information that defines various settings of an application (the application information 1000). For example, the application setting information 1200 defines, among parameter information used to execute a series of processes, the parameter information input by the user and the parameter information set by default. For example, the application setting information 1200 defines input items for inputting parameter information by the user on the application screen and display information (e.g., application name) on the application screen. The application setting information 1200 is information that defines various settings of an application with, for example, JavaScript Object Notation (JSON).

Thus, the browser 210 causes the device 20 to display the application screen for using a service provided by the service provision system 10.

In response to a request from the browser 210, the application execution unit 122 transmits an execution request for an application (the application information 1000) to the I/O service processing unit 110.

The document service unit 130 executes a predetermined process included in a series of processes (process flow) based on the process flow information 1100. The document service unit 130 includes an OCR processing unit 131 and an e-mail delivery unit 132.

The OCR processing unit 131 performs OCR processing on an electronic file. The e-mail delivery unit 132 generates an e-mail with an electronic file attached thereto and delivers the e-mail to the designated e-mail address.

In addition to the OCR processing unit 131 and the e-mail delivery unit 132, the document service unit 130 may include various functional units such as a compression/decompression processing unit that compresses or decompresses an electronic file or a data format conversion unit that converts the data format of an electronic file.

The portal service unit 140 performs a process for the user to, for example, register an application by using the browser 310 of the PC terminal 30. The portal service unit 140 includes a UI provision unit 141 and an application registration unit 142.

The UI provision unit 141 returns portal screen information 3000 stored in the portal screen information storage unit 170 in response to a request from the browser 310. The portal is a website that enables the registration, or the like, of an application through the use of the browser 310.

The portal screen information 3000 is information that defines various screens, such as the top screen (portal top screen) of the portal or an application registration screen. The portal screen information 3000 is information that defines various screens on the browser 310 with at least any of HTML, Extensible Markup Language (XML), CSS, JavaScript, and the like.

Thus, the browser 310 causes the PC terminal 30 to display the portal top screen, the application registration screen, and the like. This allows the user of the PC terminal 30 to perform the registration operation of the application (the application information 1000) on the application registration screen.

The application registration unit 142 requests the application management unit 111 to register the application (the application information 1000) in response to a request from the UI provision unit 141. Specifically, the application registration unit 142 requests the application management unit 111 to register the application in response to the operation to register the application on the application registration screen.

The application information storage unit 150 stores the application information 1000. The application information 1000 is stored in the application information storage unit 150 in association with the application ID for identifying the application information 1000. The application ID is, for example, the Uniform Resource Locator (URL) of the application information 1000 or the identification information included in the URL of the application information 1000.

The application information 1000 includes the process flow information 1100 and the application setting information 1200. For example, the application information 1000 for providing the scan translation service includes the process flow information 1100 that defines a series of processes for performing the scan translation service and the application setting information 1200 that defines various settings of the application information 1000. Hereinafter, the application information 1000 for providing the scan translation service is also referred to as "scan translation application".

The application information 1000 may include the two or more pieces of process flow information 1100 and the two or more pieces of application setting information 1200.

As described above, the process flow information 1100 is information that defines a series of processes (process flow) for performing a service provided by the application information 1000. The process flow information 1100 is described later in detail.

As described above, the application setting information 1200 is information that defines various settings of the application (the application information 1000). The application setting information 1200 is described later in detail.

The application screen information storage unit 160 stores the application screen information 2000. The application screen information 2000 is stored in the application screen information storage unit 160 in association with the application ID.

The portal screen information storage unit 170 stores the portal screen information 3000. The portal screen information 3000 is stored in the portal screen information storage unit 170 in association with the URLs of the portal top screen, the application registration screen, and the like.

The I/O service processing unit 110, the web service processing unit 120, the document service unit 130, the portal service unit 140, and the like, may be implemented by using different information processing apparatuses.

Figure 5:
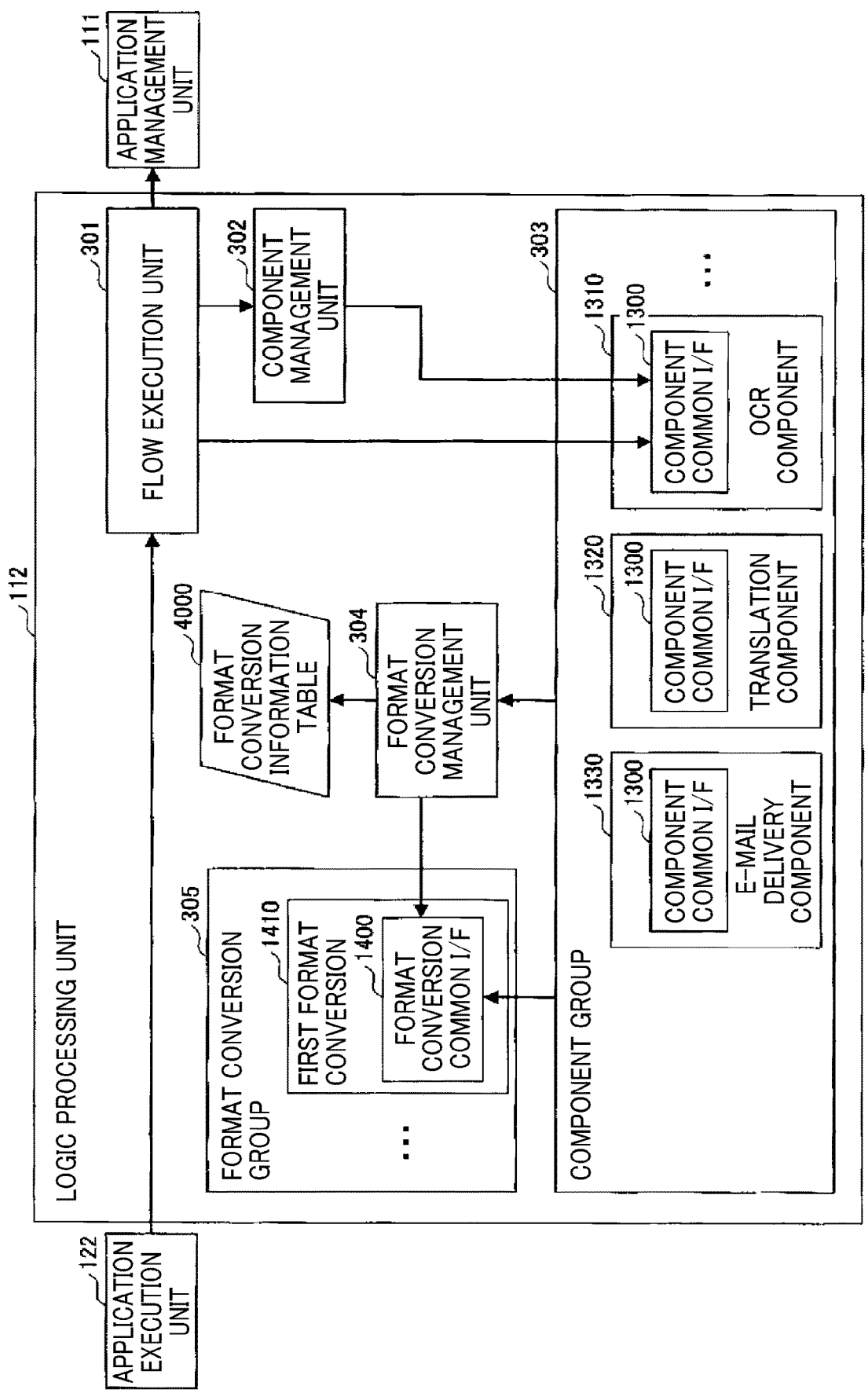
FIG. 5 is a diagram illustrating an example of the functional configuration of a logic processing unit, according to the first embodiment.

FIG. 5 is a diagram illustrating an example of the functional configuration of the logic processing unit 112 according to the first embodiment. Referring to FIG. 5, the functional configuration of the logic processing unit 112 is described in detail.

The logic processing unit 112 illustrated in FIG. 5 includes a flow execution unit 301, a component management unit 302, a component group 303, a format conversion management unit 304, and a format conversion group 305. The logic processing unit 112 includes a format conversion information table 4000.

In response to a received application execution request from the application execution unit 122, the flow execution unit 301 acquires the process flow information 1100 corresponding to the application execution request from the application management unit 111. Then, the flow execution unit 301 performs a series of processes (process flow) based on the process flow information 1100 acquired from the application management unit 111.

The components for executing the respective processes included in the series of processes are combined so that the series of processes based on the process flow information 1100 is executed. The component is implemented by using a program, a module, and the like, for executing the process to perform a predetermined function. The component is defined by a class, a function, or the like.

The component management unit 302 manages a component. The component management unit 302 generates a component in response to a request from the flow execution unit 301 and returns the generated component to the flow execution unit 301. The generation of a component refers to the loading of a component defined by a class, a function, or the like, on a memory (e.g., the RAM 12).

The component group 303 is a group of components. The component group 303 includes an OCR component 1310, a translation component 1320, and an e-mail delivery component 1330.

The OCR component 1310 is a component that executes OCR processing on an electronic file (image file). The OCR component 1310 requests the OCR processing unit 131 in the document service unit 130 to execute OCR processing so as to execute OCR processing on an electronic file.

The translation component 1320 is a component that translates a document, in an electronic file such as a text file, described in a predetermined language into another language. The e-mail delivery component 1330 is a component that delivers an e-mail to the designated e-mail address. The e-mail delivery component 1330 requests the e-mail delivery unit 132 of the document service unit 130 to execute an e-mail delivery process so as to deliver an e-mail to the designated e-mail address.

As described above, each component executes the process to perform a predetermined function. In addition to the above-described components, the component group 303 includes various components, such as an encryption/decryption component that encrypts and decrypts an electronic file or a compression component that compresses an electronic file.

Each component included in the component group 303 includes a component common I/F 1300. The component common I/F 1300 is an application programming interface (API) that is defined in common for each component. The component common I/F 1300 includes an API for generating a component and an API for executing the process of a component.

As each of the components includes the component common i/F 1300, the effect due to the addition of a component, or the like, may be localized. That is, a component may be added, or the like, without affecting, for example, the flow execution unit 301 and the component management unit 302. With the service provision system 10 according to the present embodiment, it is possible to reduce development man-hours associated with the addition, or the like, of a predetermined function (that is, the addition, or the like, of a component to execute the process for performing the function).

The format conversion management unit 304 manages the data format conversion. The data format that may be processed by each component is previously determined. The format conversion management unit 304 refers to, for example, the format conversion information table 4000 illustrated in FIG. 6 in response to a request from a component to generate a format conversion included in the format conversion group 305.

The format conversion management unit 304 requests the generated format conversion to execute a format conversion process. The format conversion is implemented by using a program, a module, or the like, that executes a data format conversion process. The format conversion is defined by, for example, a class or a function. The generation of a format conversion is the loading of a format conversion defined by, for example, a class or a function on a memory (e.g., the RAM 12).

Examples of the data format include the data format "InputStream" indicating stream data, "LocalFilePath" indicating the path (address) of an electronic file stored in a storage device, etc., and "File" indicating the entity of an electronic file.

Figures 6, 7:
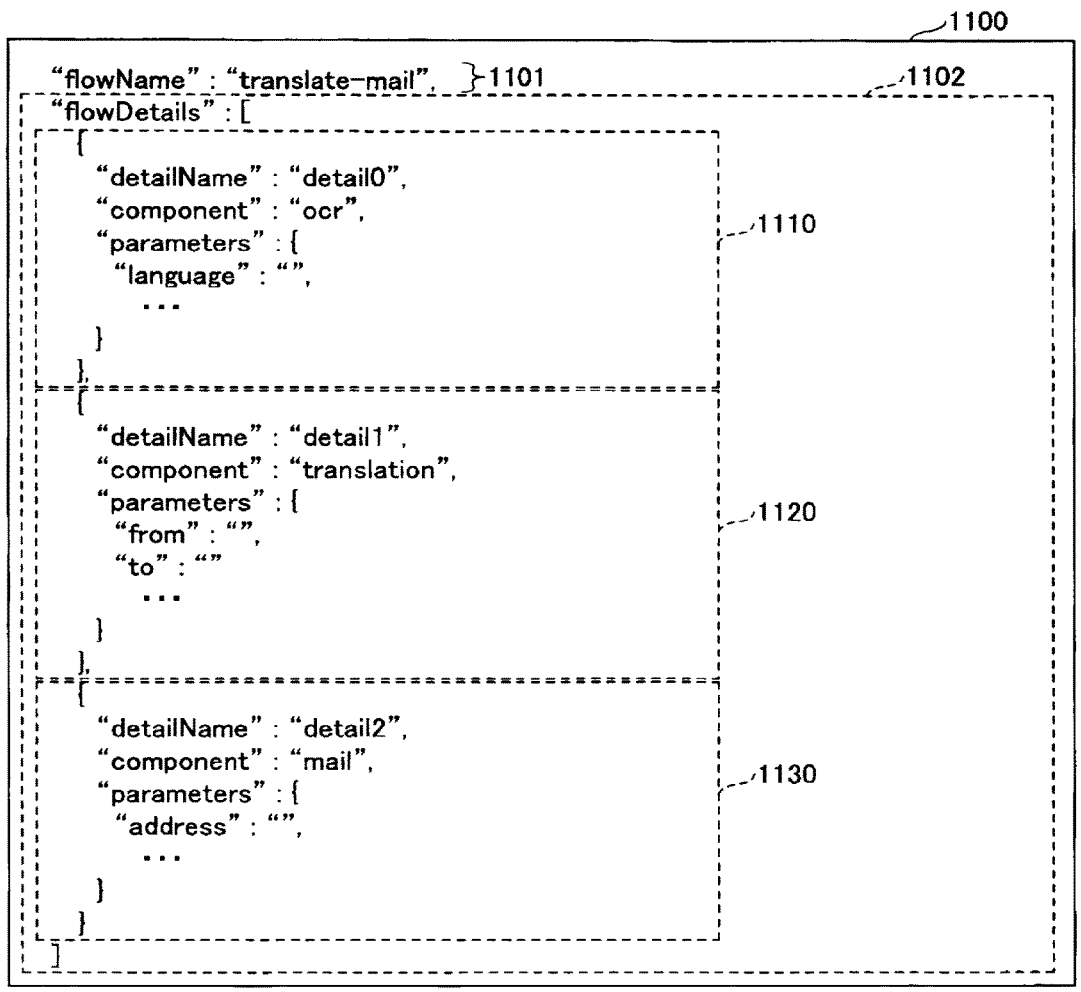
FIG. 6 is a table illustrating an example of a format conversion information table, according to the first embodiment.
FIG. 7 is a diagram illustrating an example of process flow information, according to the first embodiment.

FIG. 6 is a table illustrating an example of the format conversion information table 4000. Referring to FIG. 6, the format conversion information table 4000 is described.

The format conversion information table 4000 illustrated in FIG. 6 contains, as data items, a data format before conversion, a data format after conversion, and a format conversion to be generated. That is, in the format conversion information stored in the format conversion information table 4000, each data format before conversion and each data format after conversion are associated with the format conversion for converting the data format before conversion into the data format after conversion.

The format conversion group 305 is a group of format conversions. The format conversion group 305 includes a first format conversion 1410 for converting the data format "InputStream" to "LocalFilePath". In addition, the format conversion group 305 includes, for example, a second format conversion for converting the data format "LocalFilePath" to "File".

Each format conversion included in the format conversion group 305 includes a format conversion common I/F 1400. The format conversion common i/F 1400 is an API defined in common for each format conversion. The format conversion common I/F 1400 includes an API for generating a format conversion and an API for executing a format conversion process for a format conversion.

As each format conversion includes the format conversion common I/F 1400, the effect due to the addition, or the like, of a format conversion may be localized. That is, a format conversion may be added, or the like, without affecting, for example, the format conversion management unit 304. With the service provision system 10 according to the present embodiment, it is possible to reduce development man-hours associated with the addition, or the like, of a format conversion.

FIG. 7 is a diagram illustrating an example of the process flow information 1100. Referring to FIG. 7, the process flow information 1100 included in the application information 1000 for providing the scan translation service is described.

The process flow information 1100 illustrated in FIG. 7 is information that defines a series of processes (process flow) for performing the scan translation service.

The process flow information 1100 illustrated in FIG. 7 includes a flow name 1101 identifying the process flow information 1100 and flow details 1102 defining processing details of each process included in the process flow.

The flow details 1102 include a detailed process definition 1110, a detailed process definition 1120, and a detailed process definition 1130 that define the respective processes included in the process flow. The detailed process definitions 1110 to 1130 include "detailName" indicating the detailed process name for identifying a detailed process definition, "component" indicating the name of the component to execute a process, and "parameters" for defining the parameter information for the component.

Specifically, "detail0" is defined in "detailName" of the detailed process definition 1110. The component name "ocr" of the OCR component 1310 is defined in "component" of the detailed process definition 1110. The parameter information, or the like, with the parameter name "language" is defined in "parameters" of the detailed process definition 1110.

The parameter information with the parameter name "language" is the parameter information in which an OCR processing language (e.g., "Japanese" and "English") is set as a parameter value.

Similarly, "detail1" is defined in "detailName" of the detailed process definition 1120. The component name "translation" of the translation component 1320 is defined in "component" of the detailed process definition 1120. The parameter information with the parameter name "from", the parameter information with the parameter name "to", and the like, are defined in "parameters" of the detailed process definition 1120.

The parameter information with the parameter name "from" is the parameter information for setting the source language (e.g., "English") as a parameter value. The parameter information with the parameter name "to" is the parameter information for setting the target language (e.g., "Japanese") as a parameter value.

Similarly, "detail2" is defined in "detailName" of the detailed process definition 1130. The component name "mail" of the e-mail delivery component 1330 is defined in "component" of the detailed process definition 1130. The parameter information with the parameter name "address", or the like, is defined in "parameters" of the detailed process definition 1130.

The parameter information with the parameter name "address" is the parameter information for setting the e-mail address of the mail recipient as a parameter value.

The execution order of the processes defined in the respective detailed process definitions is the order from the top as defined in the flow details 1102. Specifically, in the series of processes (process flow) based on the process flow information 1100 illustrated in FIG. 7, the process defined in the detailed process definition 1110, the process defined in the detailed process definition 1120, and then the process defined in the detailed process definition 1130 are sequentially executed. This is not a limitation and, for example, the information indicating the execution order of the processes defined in the respective detailed process definitions may be defined in the process flow information 1100.

Although the parameter value of each set of parameter information is not set in the example illustrated in FIG. 7, this is not a limitation, and the default parameter value may be set.

Details of the Process of the Information Processing System

Figure 8:
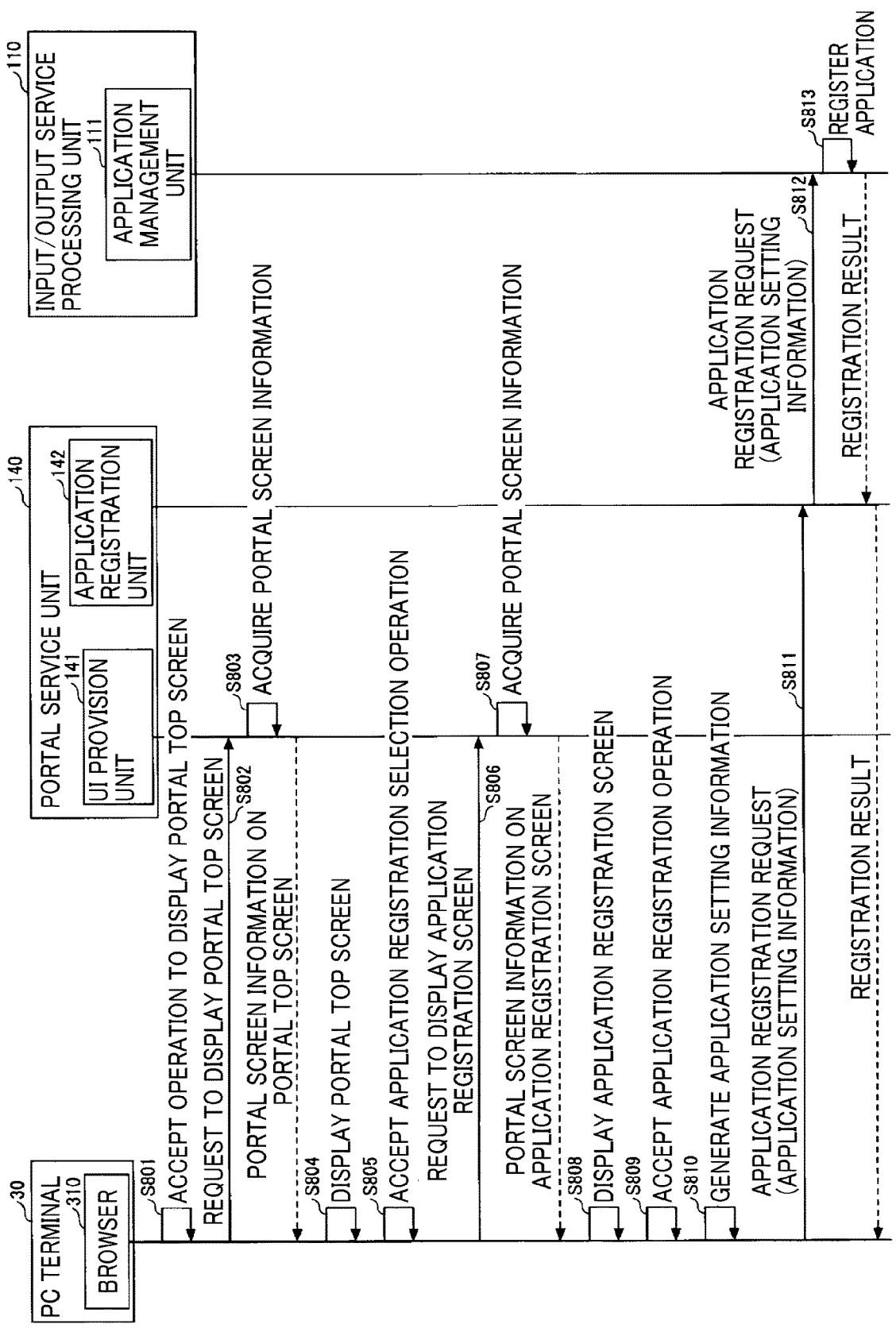
FIG. 8 is a sequence diagram illustrating an example of an application registration process, according to the first embodiment.

FIG. 8 is a sequence diagram illustrating an example of an application registration process. Referring to FIG. 8, the details of the process of the information processing system 1 according to the present embodiment are described. First, referring to FIG. 8, the process performed by the user of the PC terminal 30 to register the scan translation application in the service provision system 10 is described.

First, the browser 310 of the PC terminal 30 accepts an operation (portal top screen display operation) to display the portal top screen (Step S801). For example, the user of the PC terminal 30 may input the URL of the portal top screen into the address bar in the browser 310 to perform the portal top screen display operation.

In response to the accepted portal top screen display operation, the browser 310 of the PC terminal 30 transmits a portal top screen display request to the UI provision unit 141 of the portal service unit 140 (Step S802).

In response to the received portal top screen display request, the UI provision unit 141 of the portal service unit 140 acquires the portal screen information on the portal top screen from the portal screen information storage unit 170 (Step S803). Then, the UI provision unit 141 returns the portal screen information acquired from the portal screen information storage unit 170 to the browser 310.

Figure 9:
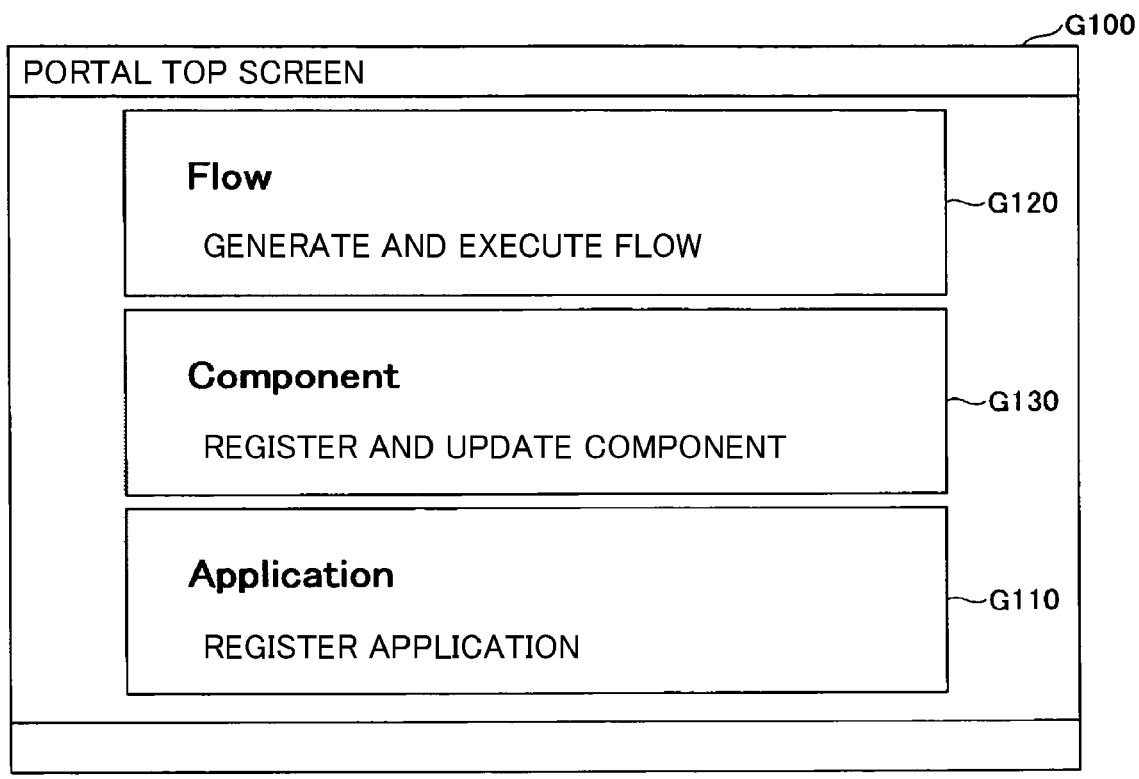
FIG. 9 is a diagram illustrating an example of a portal top screen, according to the first embodiment.

In response to the received portal screen information on the portal top screen, the browser 310 of the PC terminal 30 displays, for example, a portal top screen G100 illustrated in FIG. 9 based on the portal screen information (Step S804).

The portal top screen G100 illustrated in FIG. 9 is the top screen of the portal. The portal top screen G100 includes an "Application" button G110 for registering an application. Hereinafter, it is assumed that the user performs an operation (application registration selection operation) to select the "Application" button G110 on the portal top screen G100 illustrated in FIG. 9.

The portal top screen G100 illustrated in FIG. 9 includes: a "Flow" button G120 for, for example, generating the process flow information 1100; and a "Component" button G130 for, for example, registering a component. On the portal top screen G100, in addition to the registration of an application, for example, the generation and execution of a process flow and the registration and updating of a component may be performed.

The browser 310 of the PC terminal 30 accepts the application registration selection operation performed by the user (Step S805).

In response to the accepted application registration selection operation, the browser 310 of the PC terminal 30 transmits an application registration screen display request to the UI provision unit 141 of the portal service unit 140 (Step S806).

In response to the received application registration screen display request, the UI provision unit 141 of the portal service unit 140 acquires the portal screen information on the application registration screen from the portal screen information storage unit 170 (Step S807). Then, the UI provision unit 141 returns the portal screen information acquired from the portal screen information storage unit 170 to the browser 310.

In response to the received portal screen information on the application registration screen, the browser 310 of the PC terminal 30 displays, for example, an application registration screen G200 illustrated in FIG. 10 based on the portal screen information (Step S808).

Referring to FIGS. 10 to 14, a case where the user performs the application registration operation is described.

The application registration screen G200 illustrated in FIG. 10 is a screen for the user to select the type of application to be registered.

The application registration screen G200 illustrated in FIG. 10 includes a "print" button G210 for registering a print type application and a "scan" button G220 for registering a scan type application. The application registration screen G200 illustrated in FIG. 10 may include, for example, a "fax" button for registering a fax type application or a "mail reception" button for registering a mail reception type application.

The application registration screen G200 illustrated in FIG. 10 includes a "next" button G240 for transitioning to the next screen.

On the application registration screen G200 illustrated in FIG. 10, the description of the print type or the description of the scan type is displayed in a description field G230 in response to the user's selection of either the "print" button G210 or the "scan" button G220.

The print type is the type of application for printing an electronic file indicating the execution result of a series of processes with an image forming apparatus, or the like. The scan type is the type of application for executing a series of processes with the input of an electronic file generated through scanning by an image forming apparatus, or the like.

The fax type is, for example, the type of application for faxing an electronic file indicating the execution result of a series of processes with an image forming apparatus, or the like. The mail reception type is the type of application for executing a series of processes with the input of the electronic file attached to an e-mail received by an image forming apparatus, or the like.

Hereinafter, it is assumed that the user performs an operation to select the "scan" button G220 and press the "next" button G240 on the application registration screen G200 illustrated in FIG. 10. The browser 310 accepts the operation and displays, for example, an application registration screen G300 illustrated in FIG. 11. The application registration screen G300 illustrated in FIG. 11 is a screen for the user to set the basic information on the application.

The application registration screen G300 illustrated in FIG. 11 includes: an "application name" input setting field G310 for setting the name of an application; and a "design template" selection field G320 for selecting the format of the application screen. The application registration screen G300 illustrated in FIG. 11 further includes: an "authentication" selection field G330 for selecting an authentication to using the application; and a "display language" selection field G340 for selecting a display language of the application screen. The application registration screen G300 illustrated in FIG. 11 further includes, for example, a "next" button G350 for transitioning to the next screen.

On the "design template" selection field G320, it is possible to select, for example, "single screen format" where the application screen is displayed as a single screen, or "wizard format" where the application screen is displayed in an interactive format. In the "authentication" selection field G330, it is possible to select, for example, "none" indicating that no authentication is applied or "user authentication" indicating that authentication is applied.

Hereinafter, it is assumed that the user performs an operation to input the application name or make various selections as in the application registration screen G300 illustrated in FIG. 11 and then press the "next" button G350. The browser 310 accepts the operation and displays, for example, an application registration screen G400 illustrated in FIG. 12.

Figure 12:
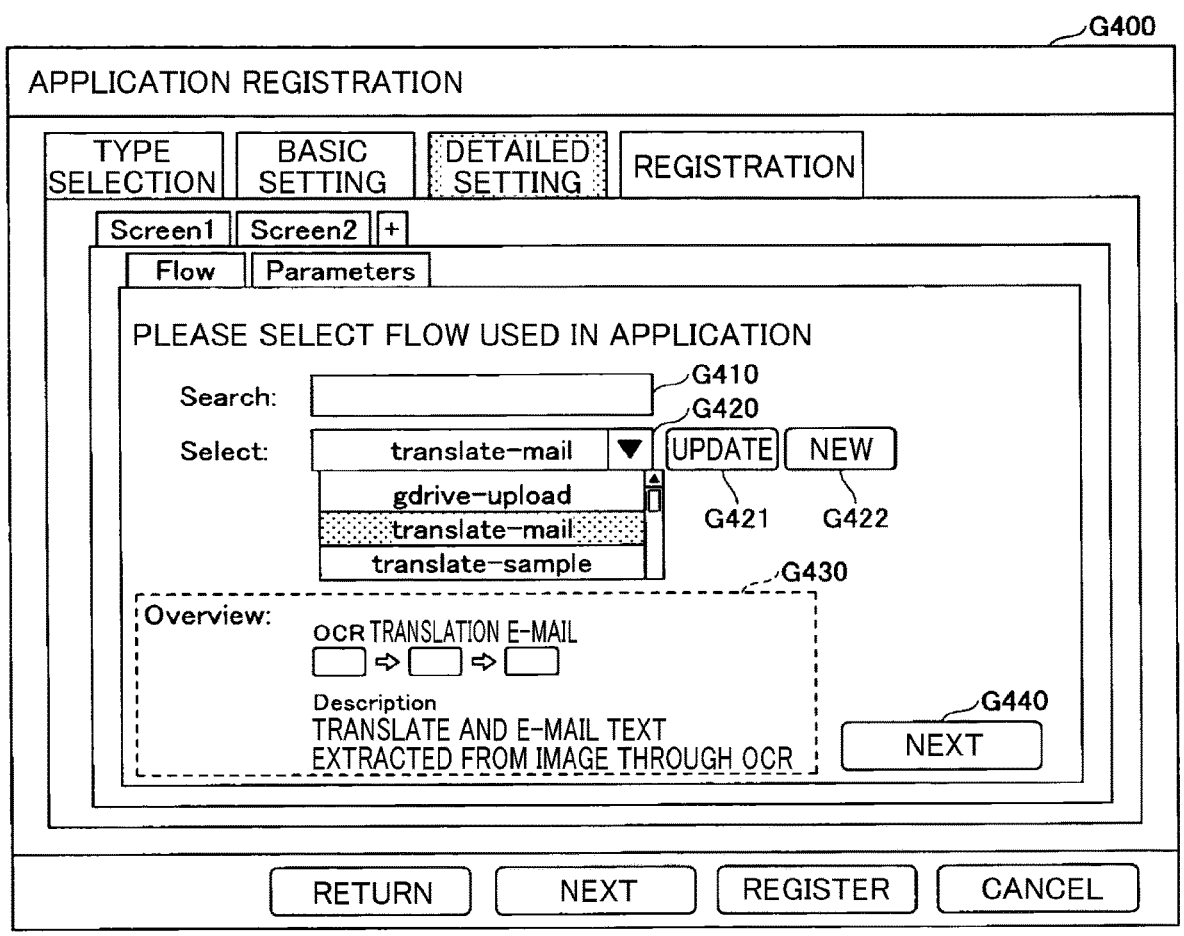
FIG. 12 is a diagram illustrating the application registration screen (3/5), according to the first embodiment.

The application registration screen G400 illustrated in FIG. 12 is a screen for the user to set a series of processes (process flow) for the application to be registered as detailed information on the application.

The application registration screen G400 illustrated in FIG. 12 includes: a search field G410 for searching for the flow name of the process flow information 1100 stored in the application information storage unit 150; and a flow selection field G420 for selecting a flow name. The user may input the name of the desired flow, or the like, into the search field G410 and select the desired flow name from the flow selection field G420.

The application registration screen G400 illustrated in FIG. 12 includes: an overview display field G430 for displaying the overview of a series of processes based on the process flow information 1100 with the flow name selected in the flow selection field G420; and a "next" button G440 for transitioning to the next screen.

The application registration screen G400 illustrated in FIG. 12 includes: an "update" button G421 for editing and updating the process flow information 1100 with the flow name selected in the flow selection field G420; and a "new" button G422 for generating the new process flow information 1100. The user presses the "update" button G421 so as to edit and update the process flow information 1100 with the flow name selected in the flow selection field G420. The user presses the "new" button G422 so as to generate the process flow information 1100 and select the flow name of the generated process flow information 1100 from the flow selection field G420.

Hereinafter, it is assumed that the user performs an operation to select the flow name "translate-mail" in the flow selection field G420 and press the "next" button G440. The browser 310 accepts the operation and displays, for example, an application registration screen G500 illustrated in FIG. 13.

Figure 13:
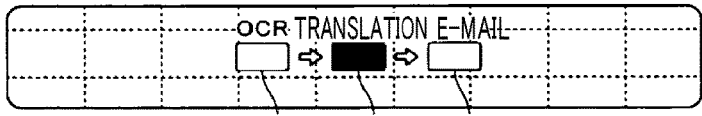
FIG. 13 is a diagram illustrating the application registration screen (4/5), according to the first embodiment.

The application registration screen G500 illustrated in FIG. 13 is a screen for the user to set the parameter information on the series of processes (process flow) set in the application registration screen G400 illustrated in FIG. 12 as the detailed information on the application.

The application registration screen G500 illustrated in FIG. 13 includes a "component" selection field G510 for selecting a component to execute each process included in the series of processes. The application registration screen G500 illustrated in FIG. 13 includes: a "parameter information" setting field G520 for setting the parameter information on the component selected in the "component" selection field G510; and a "next" button G530 for transitioning to the next screen.

The user may select the desired component from the "component" selection field G510 and make various settings for the parameter information in the "parameter information" setting field G520. For example, in a case where the user selects the translation component 1320 from the "component" selection field G510, various settings for the parameter information used by the translation component 1320 may be configured in the "parameter information" setting field G520.

Specifically, there are setting items such as "select", "display name", "name", "type", "default", and "input type" for various settings of parameter information. The parameter name of the parameter information is set in the setting item "name". The data format that may be set as a parameter value is set in the setting item "type". The parameter value set by default is set in the setting item "default".

In the setting item "select", the setting is configured as to whether the user (the user of the service) is prompted to input a parameter value of the parameter information. For the parameter information with the setting item "select" checked, the user (the user of the service) is able to input a parameter value on the application screen. Conversely, for the parameter information with the setting item "select" not checked, the user is not able to input a parameter value on the application screen, and therefore the parameter value set in the setting item "default" is used.

In the setting item "input type", an input method for the application screen is set for the parameter information of which the setting item "select" is checked. In the setting item "input type", for example, the input method "list-radio-button" for selecting a desired parameter value from the list of parameter values or the input method "text" for directly inputting a parameter value may be set. In addition, for example, an input method for inputting coordinates on the screen, or the input method for selecting a desired folder or file may be selected in the setting item "input type".

In the setting item "display name", the display name of an input item (an item for inputting a parameter value) displayed on the application screen is set. The display name in the language selected in the "display language" selection field G340 on the application registration screen G300 illustrated in FIG. 11 may be set in the setting item "display name". Specifically, in a case where, for example, "Japanese" and "English" are selected in the "display language" selection field G340, the Japanese display name "翻訳元" and the English display name "Source Language" may be set in the setting item "display name".

Thus, with regard to the parameter information used by each component, the user may make the setting as to whether the user of the service is prompted to input a parameter value of the parameter information, the setting for the input method, and the like.

Hereinafter, it is assumed that the user performs an operation to set the parameter information used by each component and press the "next" button G530. The browser 310 accepts the operation and displays, for example, an application registration screen G600 illustrated in FIG. 14.

The application registration screen G600 illustrated in FIG. 14 is a screen for the user to check various types of information (application setting information) set in FIGS. 10 to 13.

The application registration screen G600 illustrated in FIG. 14 includes an "application setting information" display field G610 and a "register" button G620. The user may confirm various types of information set in FIGS. 10 to 13 in the "application setting information" display field G610.

Here, it is assumed that the user confirms the application setting information in the "application setting information" display field G610 and performs an operation (application registration operation) to press a "register" button G620. Then, the browser 310 accepts the application registration operation (Step S809).

In response to the accepted application registration operation, the browser 310 generates the application setting information 1200 illustrated in FIG. 15, for example (Step S810).

FIG. 15 is a diagram illustrating an example of the application setting information 1200. Referring to FIG. 15, the application setting information 1200 is described.

The application setting information 1200 illustrated in FIG. 15 includes an application type 1201, an application name 1202, an application display name 1203, an authentication type 1204, and a flow name 1205. The application setting information 1200 illustrated in FIG. 15 further includes a design template type 1206, a default parameter 1207, a user input parameter 1208, etc.

The application type 1201 is the type of application selected on the application registration screen G200 illustrated in FIG. 10. In the example illustrated in FIG. 15, "app_type":"scan" indicating that the type of application is a scan type is defined.

The application name 1202 is the application name input to the "application name" input setting field G310 of the application registration screen G300 illustrated in FIG. 11. In the example illustrated in FIG. 15, "appName":"scan translation application" indicating that the application name is "scan translation application" is defined.

The application display name 1203 is the application name (title) displayed on the application screen. In the example illustrated in FIG. 15, displaying "スキャン翻訳" in Japanese and "Translation App" in English is defined.

The authentication type 1204 is the authentication selected in the "authentication" selection field G330 on the application registration screen G300 illustrated in FIG. 11. In the example illustrated in FIG. 15, "loginType":"none" indicating that no authentication is performed is defined.

The flow name 1205 is the flow name selected in the flow selection field G420 of the application registration screen G400 illustrated in FIG. 12. In the example illustrated in FIG. 15, "flowName":"translate-mail" indicating that the flow name is "translate-mail" is defined.

The design template type 1206 is the display format selected in the "design template" selection field G320 of the application registration screen G300 illustrated in FIG. 11. In the example illustrated in FIG. 15, "viewTemplate": "single screen format" indicating that the application screen is displayed in a single screen format is defined.

The default parameter 1207 defines the parameter information for which the user does not input a parameter value on the application screen. Specifically, the default parameter 1207 defines the parameter information of which the setting item "select" is not checked in the "parameter information" setting field G520 on the application registration screen G500 illustrated in FIG. 13. In the example illustrated in FIG. 15, the definition is made such that "English" is set as the default parameter value of the parameter information with the parameter name "language" defined in the detailed process name "detail0" (i.e., the detailed process definition 1110 in FIG. 7).

As described above, the default parameter 1207 defines the parameter information for which a parameter value is set by default. In other words, the default parameter 1207 defines the parameter information for which the user does not set a parameter value.

The user input parameter 1208 defines the parameter information for which the user inputs a parameter value on the application screen. Specifically, the user input parameter 1208 defines the parameter information of which the setting item "select" is checked in the "parameter information" setting field G520 on the application registration screen G500 illustrated in FIG. 13.

An input definition 1218, an input definition 1228, and an input definition 1238 are defined in the example illustrated in FIG. 15. The input definition 1218 indicates that a parameter value of the parameter name "from" defined in the detailed process name "detail 1" (that is, the detailed process definition 1120 in FIG. 7) is input by the user. Similarly, the input definition 1228 indicates that a parameter value of the parameter name "to" defined in the detailed process name "detail1" (i.e., the detailed process definition 1120 in FIG. 7) is input by the user. Similarly, the input definition 1238 indicates that a parameter value of the parameter name "address" defined in the detailed process name "detail2" (i.e., the detailed process definition 1130 in FIG. 7) is input by the user.

As described above, the user input parameter 1208 defines the parameter information for which the user inputs a parameter value on the application screen.

As described above, the application setting information 1200 defines the display information (e.g., a title) displayed on the application screen, an input item (an item for which a parameter value is input or selected) on the application screen, an input method for the input item, and the like. The application setting information 1200 further defines the parameter information for which a parameter value is set by default (i.e., the parameter information for which a parameter value is not input or selected on the application screen), and the like.

After generating the application setting information 1200, the browser 310 transmits an application registration request to the application registration unit 142 of the portal service unit 140 (Step S811). The application registration request includes the application setting information 1200 generated at Step S810.

In response to the received application registration request, the application registration unit 142 of the portal service unit 140 transmits the application registration request to the application management unit 111 of the I/O service processing unit 110 (Step S812).

In response to the received application registration request, the application management unit 111 of the I/O service processing unit 110 registers the application (Step S813). Then, the application management unit 111 returns the registration result to the browser 310.

Specifically, the application management unit 111 stores the application setting information 1200 included in the application registration request in the application information storage unit 150 in association with the application ID. As a result, the application information 1000 including the application setting information 1200 and the process flow information 1100 with the flow name defined in the flow name 1205 in the application setting information 1200 is registered in the service provision system 10.

As described above, in the information processing system 1 according to the present embodiment, the user may use the PC terminal 30 to register an application in the service provision system 10. Furthermore, in the information processing system 1 according to the present embodiment, the user may use the PC terminal 30 to set, for example, the flow name and the parameter information on each component so as to easily register an application (the application information 1000).

Therefore, with the information processing system 1 according to the present embodiment, for example, even a user (such as a planner) who does not have specialized knowledge, such as a programming language, or experience may register an application (the application information 1000) for providing various services.

FIG. 16 is a sequence diagram illustrating an example of the overall process to use the scan translation service. Referring to FIG. 16, a case where the user of the device 20 uses the scan translation service is described.

First, the browser 210 of the device 20 accepts an operation (display operation) to display the application screen of the scan translation service (Step S1601). For example, the user of the device 20 inputs the URL of the application screen of the scan translation service to the address bar of the browser 310 so as to perform the operation to display the application screen.

In response to the accepted operation to display the application screen of the scan translation service, the browser 210 of the device 20 transmits a request for displaying the application screen of the scan translation service to the screen configuration unit 121 of the web service processing unit 120 (Step S1602). The request for displaying the application screen of the scan translation service includes the application ID of the application information 1000 for providing the scan translation service.

In response to the received request for displaying the application screen of the scan translation service, the screen configuration unit 121 of the web service processing unit 120 transmits an application setting acquisition request to the application management unit 111 of the I/O service processing unit 110 (Step S1603). The application setting acquisition request includes the application ID of the application information 1000 for providing the scan translation service.

In response to the received application setting acquisition request, the application management unit 111 of the I/O service processing unit 110 acquires the application setting information 1200 stored in association with the application ID included in the application setting acquisition request from the application information storage unit 150 (Step S1604). Then, the application management unit 111 returns the application setting information 1200 acquired from the application information storage unit 150 to the screen configuration unit 121.

Subsequently, the screen configuration unit 121 of the web service processing unit 120 acquires the application screen information 2000 stored in association with the application ID of the application information 1000 for providing the scan translation service from the application screen information storage unit 160 (Step S1605). Then, the screen configuration unit 121 returns the application screen information 2000 acquired from the application screen information storage unit 160 and the application setting information 1200 returned at the above-described Step S1604 to the browser 210.

Figure 17:
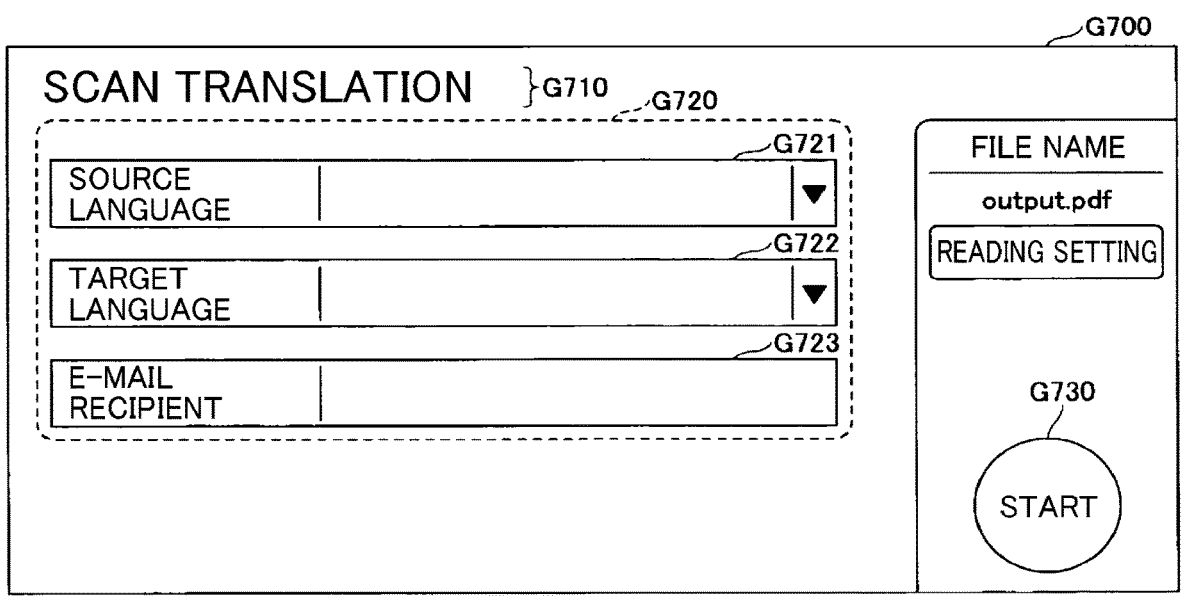
FIG. 17 is a diagram illustrating an example of an application screen for the scan translation application, according to the first embodiment.

The browser 210 of the device 20 displays, for example, an application screen G700 illustrated in FIG. 17 based on the application screen information 2000 and the application setting information 1200 received from the screen configuration unit 121 (Step S1606). The application screen G700 illustrated in FIG. 17 is a screen for the user of the device 20 to use the scan translation service.

The application screen G700 illustrated in FIG. 17 includes an application name G710, a parameter input area G720, and a "start" button G730. The parameter input area G720 includes a source language input field G721, a target language input field G722, and a mail recipient input field G723.

The application name G710 is displayed based on the application display name 1203 in the application setting information 1200 illustrated in FIG. 15. In a case where application names (titles) in multiple languages are defined in the application display name 1203, the application name in the language corresponding to the language setting of the browser 210 is displayed in the application name G710.

The source language input field G721, the target language input field G722, and the mail recipient input field G723 are displayed based on the user input parameter 1208 in the application setting information 1200 illustrated in FIG. 15.

Specifically, the source language input field G721 is displayed based on the input definition 1218 of the user input parameter 1208. Also, the target language input field G722 is displayed based on the input definition 1228 of the user input parameter 1208. Also, the mail recipient input field G723 is displayed based on the input definition 1238 of the user input parameter 1208.

As described above, on the application screen for the user of the device 20 to use a service, the application name G710 and the parameter input area G720 are displayed based on the information defined in the application setting information 1200.

Here, it is assumed that, on the application screen G700 illustrated in FIG. 17, the user inputs "English" to the source language input field G721, "Japanese" to the target language input field G722, and "abc@abc.co.jp" to the mail recipient input field G723. Furthermore, it is assumed that, on the application screen G700 illustrated in FIG. 17, the user performs an operation (execution operation) to press the "start" button G730.

Then, the browser 210 of the device 20 accepts the execution operation (Step S1607). Subsequently, the browser 210 of the device 20 controls the scanner 26 to read the document and generate an electronic file (image file) (Step S1608).

In response to the generation of the electronic file (image file), the browser 210 of the device 20 transmits an application execution request to the application execution unit 122 of the web service processing unit 120 (Step S1609). The application execution request includes the flow name "translate-mail" defined in the flow name 1205 of the application setting information 1200, the electronic file generated at the above-described Step S1608, and the parameter setting information.

The parameter setting information is the parameter information defined in the default parameter 1207 of the application setting information 1200 and the parameter information for which a parameter value is set by the user on the application screen G700.

Specifically, the parameter information defined in the default parameter 1207 is "language":"English". The parameter information for which a parameter value is set by the user on the application screen G700 is "from":"English", "to":"Japanese", and "address": "abc@abc.co.jp".

In response to the received application execution request, the application execution unit 122 of the web service processing unit 120 transmits the application execution request to the logic processing unit 112 of the I/O service processing unit 110 (Step S1610).

Subsequently, in response to the received application execution request, the logic processing unit 112 of the I/O service processing unit 110 performs a process to execute the process flow (Step S1611). That is, the logic processing unit 112 performs the series of processes based on the process flow information 1100 with the flow name included in the application execution request. The process to execute the process flow is described later in detail.

Then, the logic processing unit 112 returns the processing result of the process to execute the process flow to the browser 210 via the web service processing unit 120. As a result, the service provision system 10 according to the present embodiment may provide the scan translation service.

Figure 18:
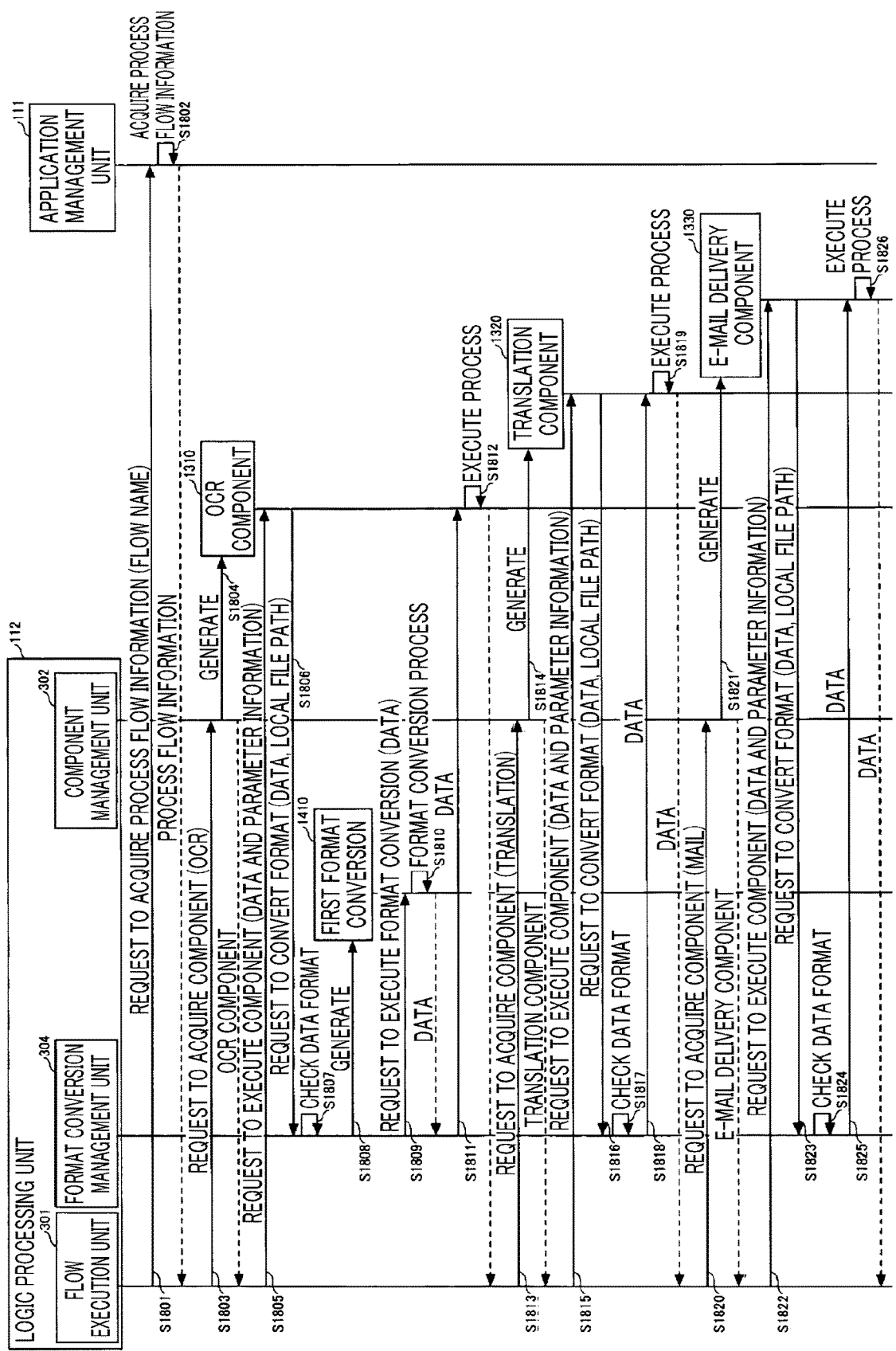
FIG. 18 is a sequence diagram illustrating an example of an execution process of a process flow implementing a scan translation service, according to the first embodiment.

FIG. 18 is a sequence diagram illustrating an example of the execution process of the process flow implementing the scan translation service. Referring to FIG. 18, the process (the process at Step S1611 in FIG. 16) to execute the process flow is described in detail.

First, in response to the received application execution request from the application execution unit 122, the flow execution unit 301 transmits a process flow acquisition request to the application management unit 111 (Step S1801). The process flow acquisition request includes the flow name "translate-mail".

In response to the received process flow acquisition request, the application management unit 111 acquires the process flow information 1100 with the flow name "translate-mail" included in the process flow acquisition request from the application information storage unit 150 (Step S1802). Then, the application management unit 111 returns the process flow information 1100 acquired from the application information storage unit 150 to the flow execution unit 301.

In the following description, it is assumed that the application management unit 111 returns the process flow information 1100 illustrated in FIG. 7 to the flow execution unit 301.

Subsequently, the flow execution unit 301 transmits a component acquisition request based on the process flow information 1100 to the component management unit 302 (Step S1803).

Specifically, the flow execution unit 301 transmits a component acquisition request for the component name "ocr" defined in "component" included in the detailed process definition 1110 of the process flow information 1100 illustrated in FIG. 7 to the component management unit 302.

In response to the received component acquisition request, the component management unit 302 generates the component (i.e., the OCR component 1310) with the component name "ocr" (Step S1804). The OCR component 1310 may be generated by using the API that is defined in the component common I/F 1300 for generating a component.

Then, the component management unit 302 returns the generated OCR component 1310 to the flow execution unit 301. Specifically, the component management unit 302 returns, to the flow execution unit 301, for example, the address on the memory (e.g., the RAM 12) where the OCR component 1310 is loaded.

Subsequently, the flow execution unit 301 transmits a component execution request to the OCR component 1310 (Step S1805). The component execution request includes data and parameter information.

The data is an electronic file having the data format "InputStream" received from the browser 210. Specifically, the flow execution unit 301 regards the electronic file received from the browser 210 simply as "data" (does not consider the data format), delivers it to the OCR component 1310, and requests the execution of a process. According to the present embodiment, various types of information such as electronic files without consideration for the data format as described above are simply referred to as "data".

For the parameter information, each parameter value in the parameter setting information is set to the parameter value of each piece of parameter information defined in "parameters" included in the detailed process definition 1110 of the process flow information 1100 illustrated in FIG. 7. That is, the parameter information is, for example, "language": "English".

In response to the received component execution request, the OCR component 1310 transmits a format conversion request to the format conversion management unit 304 (Step S1806). The format conversion request includes the data and the designated "LocalFilePath" indicating the data format that may be processed by the OCR component 1310.

In response to the received format conversion request, the format conversion management unit 304 checks whether the data format of the data included in the format conversion request matches the designated data format (Step S1807).

The data format of the data included in the format conversion request is "InputStream", while the designated data format is "LocalFilePath". Therefore, the format conversion management unit 304 determines that the data format of the data included in the format conversion request does not match the designated data format.

Then, the format conversion management unit 304 refers to the format conversion information table 4000 to identify the format conversion for converting the data format "InputStream" to "LocalFilePath" (here, the first format conversion 1410 is identified). Then, the format conversion management unit 304 generates the identified first format conversion 1410 (Step S1808). The first format conversion 1410 may be generated by using the format conversion common OF 1400.

Subsequently, the format conversion management unit 304 transmits a format conversion execution request to the first format conversion 1410 (Step S1809). The format conversion process execution request includes data.

In response to the received format conversion process execution request, the first format conversion 1410 performs a format conversion process to convert the data format "InputStream" of the data included in the format conversion process execution request to "LocalFilePath" (Step S1810). Then, the first format conversion 1410 returns the data with the converted data format to the format conversion management unit 304.

Then, in response to the received data from the first format conversion 1410, the format conversion management unit 304 transmits the data to the OCR component 1310 (Step S1811).

In response to the received data from the format conversion management unit 304, the OCR component 1310 executes a process on the data by using the parameter information (Step S1812).

Specifically, the OCR component 1310 uses the OCR processing unit 131 to execute OCR processing in English on the electronic file indicated by the data by using the parameter information "language":"English".

Then, the OCR component 1310 returns the data indicating the electronic file (i.e., text file) having undergone the OCR processing to the flow execution unit 301.

Subsequently, the flow execution unit 301 transmits a component acquisition request based on the process flow information 1100 to the component management unit 302 (Step S1813).

Specifically, the flow execution unit 301 transmits an acquisition request for the component with the component name "translation" defined in "component" included in the detailed process definition 1120 of the process flow information 1100 illustrated in FIG. 7 to the component management unit 302.

In response to the received acquisition request for the component, the component management unit 302 generates a component (i.e., the translation component 1320) with the component name "translation" (Step S1814). The translation component 1320 may be generated by using the API defined in the component common I/F 1300 for generating a component.

Then, the component management unit 302 returns the generated translation component 1320 to the flow execution unit 301. Specifically, the component management unit 302 returns, to the flow execution unit 301, for example, the address on the memory (e.g., the RAM 12) where the translation component 1320 is loaded.

Subsequently, the flow execution unit 301 transmits a component execution request to the translation component 1320 (Step S1815). The component execution request includes data and parameter information.

The data is data returned from the OCR component 1310 (i.e., the path indicating the electronic file having undergone OCR processing).

For the parameter information, each parameter value in the parameter setting information is set to the parameter value of each piece of parameter information defined in "parameters" included in the detailed process definition 1120 of the process flow information 1100 illustrated in FIG. 7. That is, the parameter information is, for example, "from":"English" and "to":"Japanese".

In response to the received component execution request, the translation component 1320 transmits a format conversion request to the format conversion management unit 304 (Step S1816). The format conversion request includes the data and the designated "LocalFilePath" indicating the data format that may be processed by the translation component 1320.

In response to the received format conversion request, the format conversion management unit 304 checks whether the data format of the data included in the format conversion request matches the designated data format (Step S1817).

The data format of the data included in the format conversion request is "LocalFilePath", while the designated data format is also "LocalFilePath". Therefore, the format conversion management unit 304 determines that the data format of the data included in the format conversion request matches the designated data format.

Then, the format conversion management unit 304 transmits the data included in the format conversion request to the translation component 1320 (Step S1818). As described above, with regard to the checking on the data format (the process at Step S1817), when it is determined that the data format of the data matches the designated data format, the format conversion management unit 304 refrains from generating a format conversion.

In response to the data received from the format conversion management unit 304, the translation component 1320 executes a process on the data using the parameter information (Step S1819). Specifically, the translation component 1320 uses the parameter information "from":"English" and "to":"Japanese" to perform a process to translate the electronic file indicated by the data from English to Japanese.

Then, the translation component 1320 returns the data indicating the electronic file having undergone the translation process to the flow execution unit 301.

The translation component 1320 may request for example a translation server, which is connected to the service provision system 10 via the network, to perform a translation process so as to translate an electronic file.

Subsequently, the flow execution unit 301 transmits a component acquisition request based on the process flow information 1100 to the component management unit 302 (Step S1820).

Specifically, the flow execution unit 301 transmits an acquisition request for the component with the component name "mail" defined in "component" included in the detailed process definition 1130 of the process flow information 1100 illustrated in FIG. 7 to the component management unit 302.

In response to the received component acquisition request, the component management unit 302 generates a component (i.e., the e-mail delivery component 1330) with the component name "mail" (Step S1821). The e-mail delivery component 1330 may be generated by using the API defined in the component common I/F 1300 for generating a component.

Then, the component management unit 302 returns the generated e-mail delivery component 1330 to the flow execution unit 301. Specifically, the component management unit 302 returns, to the flow execution unit 301, for example, the address on the memory (e.g., the RAM 12) where the e-mail delivery component 1330 is loaded.

Subsequently, the flow execution unit 301 transmits a component execution request to the e-mail delivery component 1330 (Step S1822). The component execution request includes data and parameter information.

The data is data returned from the translation component 1320 (i.e., the path indicating the electronic file having undergone translation).

For the parameter information, each parameter value in the parameter setting information is set to the parameter value of each piece of parameter information defined in "parameters" included in the detailed process definition 1130 of the process flow information 1100 illustrated in FIG. 7. That is, the parameter information is, for example, "address": "abc@abc.co.jp".

In response to the received component execution request, the e-mail delivery component 1330 transmits a format conversion request to the format conversion management unit 304 (Step S1823). The format conversion request includes the data and the designated "LocalFilePath" indicating the data format that may be processed by the e-mail delivery component 1330.

In response to the received format conversion request, the format conversion management unit 304 checks whether the data format of the data included in the format conversion request matches the designated data format (Step S1824).

The data format of the data included in the format conversion request is "LocalFilePath", while the designated data format is also "LocalFilePath". Therefore, the format conversion management unit 304 determines that the data format of the data included in the format conversion request matches the designated data format.

Then, the format conversion management unit 304 transmits the data included in the format conversion request to the e-mail delivery component 1330 (Step S1825). As described above, with regard to the checking on the data format (the process at Step S1824), when it is determined that the data format of the data matches the designated data format, the format conversion management unit 304 refrains from generating a format conversion.

In response to the data received from the format conversion management unit 304, the e-mail delivery component 1330 executes a process on the data by using the parameter information (Step S1826).

Specifically, the e-mail delivery component 1330 uses the e-mail delivery unit 132 to generate an e-mail with the electronic file indicated by the data attached thereto. Then, the e-mail delivery component 1330 uses the e-mail delivery unit 132 to transmit the e-mail to "abc@abc.co.jp" by using the parameter information "address":"abc@abc.co.jp".

Then, the e-mail delivery component 1330 returns the data indicating the e-mail delivery result to the flow execution unit 301.

Thus, the series of processes (process flow) based on the process flow information 1100 illustrated in FIG. 7 is completely performed. This allows the service provision system 10 according to the present embodiment to provide the scan translation service to the device 20.

As described above, with the information processing system 1 according to the present embodiment, the user may use the PC terminal 30 to register the application information 1000 for providing various services in the service provision system 10. Furthermore, with the information processing system 1 according to the present embodiment, the user may use the PC terminal 30 to select the flow name and set the parameter information, or the like, as appropriate so as to easily register the application information 1000.

Thus, with the information processing system 1 according to the present embodiment, for example, even a user who does not have specialized knowledge, such as a programming language, and experience may easily generate and register an application (the application information 1000).

With the information processing system 1 according to the present embodiment, various services provided by an application registered in the service provision system 10 are available to users through the use of the device 20.

Second Embodiment

An information processing system according to a second embodiment of the present disclosure is described with a focus on differences from the information processing system 1 according to the first embodiment. In the first embodiment, the processes to register and execute the scan translation application are described. In the present embodiment, the setting of the process flow for the application that acquires and prints the document desired by the user and the operation of the application are described.

The information processing system according to the present embodiment is referred to as an "information processing system 1a". The information processing system 1a includes a service provision system 10a, the device 20, and the PC terminal 30, as illustrated below in FIG. 19. The service provision system 10a, the device 20, and the PC terminal 30 are communicatively connected via the wide area network N1, such as the Internet. The hardware configuration of the service provision system 10a according to the present embodiment is the same as the service configuration of the service provision system 10 according to the above-described first embodiment. The hardware configurations of the device 20 and the PC terminal 30 according to the present embodiment are also the same as those in the above-described first embodiment.

Service Provided by the Service Provision System

A service provided by the service provision system 10a according to the present embodiment is described here. In the following description, it is assumed that the device 20 is an MFP.

According to the present embodiment, the service for acquiring the document (file) desired by the user with the service provision system 10a and printing the document is referred to as the "acquired document printing service". In the present embodiment, a case where the service provision system 10a provides the acquired document printing service is described.

In order for the service provision system 10a to provide the acquired document printing service, the setting of the process flow of an application (the application information 1000) for the device 20 to use the acquired document printing service and the registration of the application are required to be executed in the service provision system 10a.

According to the present embodiment, a case where the PC terminal 30 executes the setting of the process flow of the application for using the acquired document printing service and the registration of the application and a case where the device 20 uses the acquired document printing service using the application are described.

Functional Configuration of the Information Processing System

Figure 19:
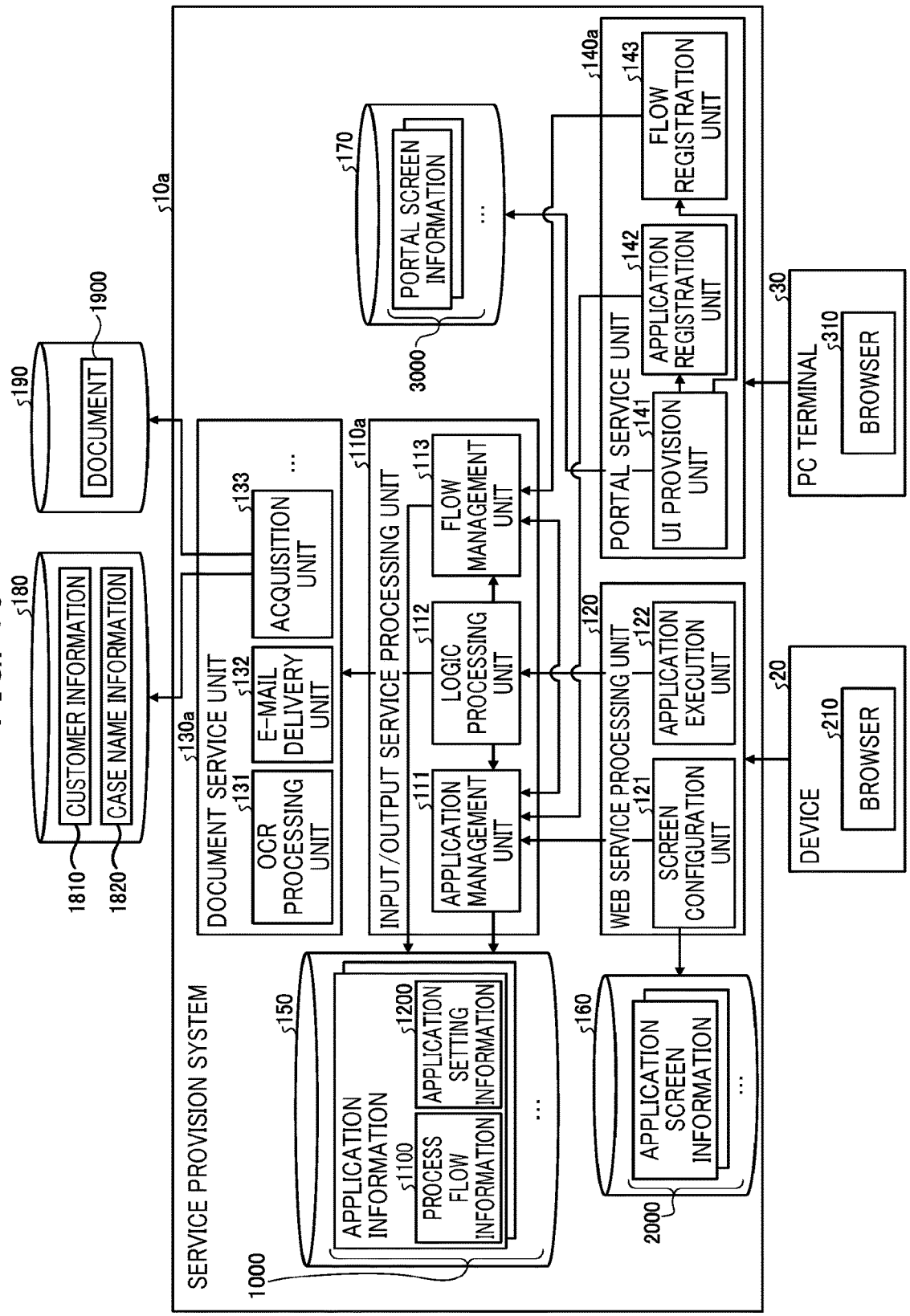
FIG. 19 is a diagram illustrating an example of the functional configuration of an information processing system, according to a second embodiment of the present disclosure.

FIG. 19 is a diagram illustrating an example of the functional configuration of the information processing system 1a according to the second embodiment. Referring to FIG. 19, the functional configuration of the information processing system 1a according to the present embodiment is described with a focus on differences from the functional configuration of the information processing system 1 according to the above-described first embodiment.

The PC terminal 30 (an example of an information processing apparatus) illustrated in FIG. 19 includes the browser 310 executed by, for example, the CPU 11. The user of the PC terminal 30 may use the browser 310 to register the application for using various services, such as "the acquired document printing service", in the service provision system 10*a*.

The device 20 (an example of an electronic device) illustrated in FIG. 19 includes the browser 210 executed by, for example, the CPU 31. The user of the device 20 may use the browser 210 to use various services such as "the acquired document printing service". That is, the device 20 may omit, for example, a dedicated application program for using various services provided by the service provision system 10*a* as long as the device 20 includes the browser 210.

The service provision system 10*a* illustrated in FIG. 19 includes an input/output service processing unit 110*a*, the web service processing unit 120, a document service unit 130*a*, and a portal service unit 140*a*. Each of these functional units is implemented by the process executed by the CPU 11 due to one or more programs installed in the service provision system 10*a*. The configuration and the function of the web service processing unit 120 are the same as those in the first embodiment.

The service provision system 10*a* includes the application information storage unit 150 (application storage means), the application screen information storage unit 160 (use screen storage means), and the portal screen information storage unit 170. These storage units may be implemented by using the auxiliary storage device 14. The configurations and functions of the application information storage unit 150, the application screen information storage unit 160, and the portal screen information storage unit 170 are the same as those in the first embodiment.

The I/O service processing unit 110*a* performs processing regarding a service provided by the service provision system 10*a*. The I/O service processing unit 110*a* includes the application management unit 111, the logic processing unit 112, and a flow management unit 113.

The application management unit 111 manages the application information 1000 stored in the application information storage unit 150.

In response to a request from the web service processing unit 120, the logic processing unit 112 acquires the process flow information 1100 (an example of setting information) included in the application information 1000 from the flow management unit 113. The logic processing unit 112 executes a series of processes (process flow) for performing the service provided by the application information 1000 based on the process flow information 1100 acquired from the flow management unit 113. This allows the service provision system 10*a* according to the present embodiment to provide various services such as "the acquired document printing service".

The functional configuration of the logic processing unit 112 is based on the configuration described in the first embodiment. For example, as is the case with the OCR component 1310, etc., the component group 303 includes a component that requests an acquisition unit 133 to perform an acquisition process.

The flow management unit 113 manages the process flow information 1100 stored in the application information storage unit 150. The flow management unit 113 returns the process flow information 1100 included in the application information 1000 in response to a request from the logic processing unit 112.

The document service unit 130*a* executes a predetermined process included in the series of processes (process flow) based on the process flow information 1100. The document service unit 130*a* includes the OCR processing unit 131, the e-mail delivery unit 132, and the acquisition unit 133 (acquisition means).

The OCR processing unit 131 performs OCR processing on an electronic file. The e-mail delivery unit 132 generates an e-mail with an electronic file attached thereto and delivers the e-mail to the designated e-mail address. The acquisition unit 133 acquires a document (file) (an example of electronic data) from an external data source in accordance with a command of the logic processing unit 112. For example, the acquisition unit 133 refers to an external customer information storage unit 180 and a document storage unit 190 as illustrated in FIG. 19 to acquire a document from the external data source.

The customer information storage unit 180 stores customer information 1810 and case name information 1820. The customer information 1810 is information that associates a user (a user who logs in to the information processing system 1*a*) and a regular customer, who is a customer of which the user is in charge. The case name information 1820 is information that associates a customer with the name of a case belonging to the customer.

The document storage unit 190 stores various types of documents (files) to be printed. The document may be stored in association with the name of the case to which the document belongs.

The portal service unit 140*a* performs a process for the user to, for example, set (register) a process flow and register an application by using the browser 310 of the PC terminal 30. The portal service unit 140*a* includes the UI provision unit 141, the application registration unit 142, and a flow registration unit 143 (registration means).

The UI provision unit 141 returns the portal screen information 3000 stored in the portal screen information storage unit 170 in response to a request from the browser 310.

As a result, the browser 310 causes the portal top screen, the process flow registration screen, the application registration screen, etc., to be displayed on the PC terminal 30. Therefore, the user of the PC terminal 30 may perform an operation to register the process flow (the process flow information 1100) on the process flow registration screen and an operation to register the application (the application information 1000) on the application registration screen.

The application registration unit 142 requests the application management unit 111 to register the application (the application information 1000) in response to a request from the UI provision unit 141. Specifically, the application registration unit 142 requests the application management unit 111 to register the application in response to the operation to register the application on the application registration screen.

The flow registration unit 143 requests the flow management unit 113 to register the process flow (the process flow information 1100) in response to a request from the UI provision unit 141. Specifically, the flow registration unit 143 requests the flow management unit 113 to register the process flow in response to the operation to register the process flow on the process flow registration screen.

Hereinafter, the application information 1000 for providing the acquired document printing service is also referred to as "acquired document printing application".

The I/O service processing unit 110*a*, the web service processing unit 120, the document service unit 130*a*, the portal service unit 140*a*, etc., may be implemented by using different information processing apparatuses.

The configuration of the process flow information 1100 included in the application information 1000 for providing the acquired document printing service is based on the configuration of the process flow information 1100 illustrated in FIG. 7 described above. For example, the flow details 1102 defining each process detail included in the process flow includes a detailed process definition that defines the details of a document acquisition process and a detailed process definition that defines the details of a printing process. As described above, these detailed process definitions include "detailName" indicating the detailed process name for identifying a detailed process definition, "component" indicating the name of the component to execute a process, and "parameters" defining the parameter information for the component.

Details of a Process of the Information Processing System

Figure 20:
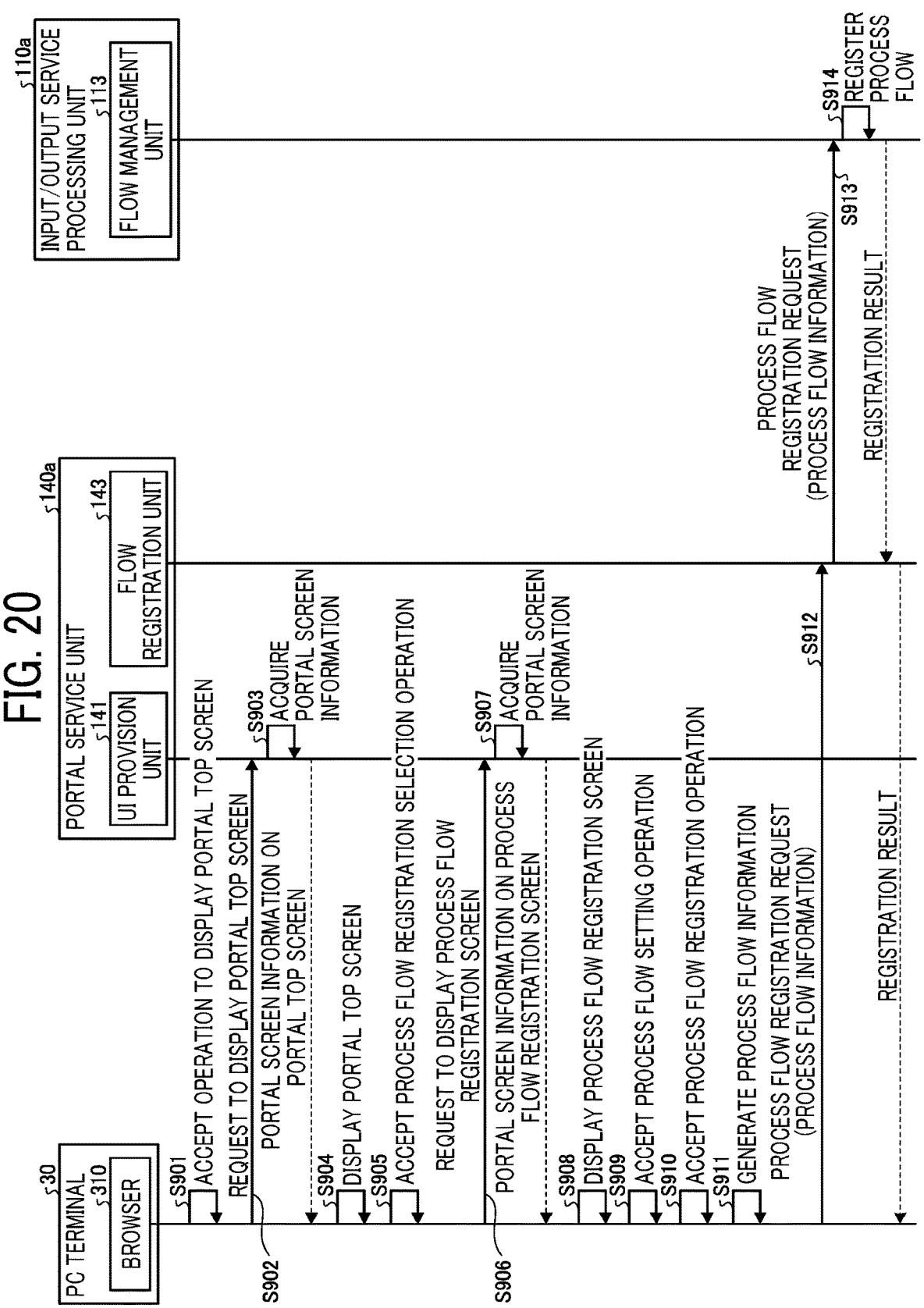
FIG. 20 is a sequence diagram illustrating an example of a registration process of a process flow, according to the second embodiment.

FIG. 20 is a sequence diagram illustrating an example of the process to register the process flow. Referring to FIG. 20, the details of the process of the information processing system 1a according to the present embodiment are described. First, referring to FIG. 20, the process performed by the user of the PC terminal 30 to register the process flow applied to the acquired document application is described.

First, the browser 310 of the PC terminal 30 accepts an operation (portal top screen display operation) to display the portal top screen (Step S901). For example, the user of the PC terminal 30 may input the URL of the portal top screen into the address bar in the browser 310 to perform the portal top screen display operation.

In response to the accepted portal top screen display operation, the browser 310 of the PC terminal 30 transmits a portal top screen display request to the UI provision unit 141 of the portal service unit 140a (Step S902).

In response to the received the portal top screen display request, the UI provision unit 141 of the portal service unit 140a acquires the portal screen information on the portal top screen from the portal screen information storage unit 170 (Step S903). Then, the UI provision unit 141 returns the portal screen information acquired from the portal screen information storage unit 170 to the browser 310.

In response to the received portal screen information on the portal top screen, the browser 310 of the PC terminal 30 displays, for example, the portal top screen G100 illustrated in FIG. 9 based on the portal screen information (Step S904).

The portal top screen G100 illustrated in FIG. 9 is the top screen of the portal. As described above, the portal top screen G100 includes: the "Application" button G110 for registering an application; the "Flow" button G120 for, for example, generating the process flow information 1100; and the "Component" button G130 for, for example, registering a component. Hereinafter, it is assumed that the user performs an operation (process flow registration selection operation) to select the "Flow" button G120 on the portal top screen G100 illustrated in FIG. 9.

The browser 310 of the PC terminal 30 accepts the process flow registration selection operation performed by the user (Step S905).

In response to the accepted process flow registration selection operation, the browser 310 of the PC terminal 30 transmits a process flow registration screen display request to the UI provision unit 141 of the portal service unit 140a (Step S906).

In response to the received process flow registration screen display request, the UI provision unit 141 of the portal service unit 140a acquires the portal screen information on the process flow registration screen from the portal screen information storage unit 170 (Step S907). Then, the UI provision unit 141 returns the portal screen information acquired from the portal screen information storage unit 170 to the browser 310.

In response to the received portal screen information on the process flow registration screen, the browser 310 of the PC terminal 30 displays, for example, a process flow registration screen G1000 illustrated in FIG. 21 based on the portal screen information (Step S908).

Referring to FIGS. 21 to 32, a case where the user performs the operation (Step S909) to set the process flow is described below.

First, the process flow registration screen G1000 illustrated in FIG. 21 is a screen for the user to select the type of application to be registered.

The process flow registration screen G1000 illustrated in FIG. 21 includes: a process flow list G1001 indicating the list of already registered process flows; and an "add" button G1002 for generating (registering) a new process flow.

Hereafter, it is assumed that the user performs an operation to press the "add" button G1002 on the process flow registration screen G1000 illustrated in FIG. 21. The browser 310 accepts the operation and displays, for example, a process flow basic setting screen G1100 illustrated in FIG. 22. The process flow basic setting screen G1100 illustrated in FIG. 22 is a screen for the user to set the basic information on a process flow.

Figure 22:
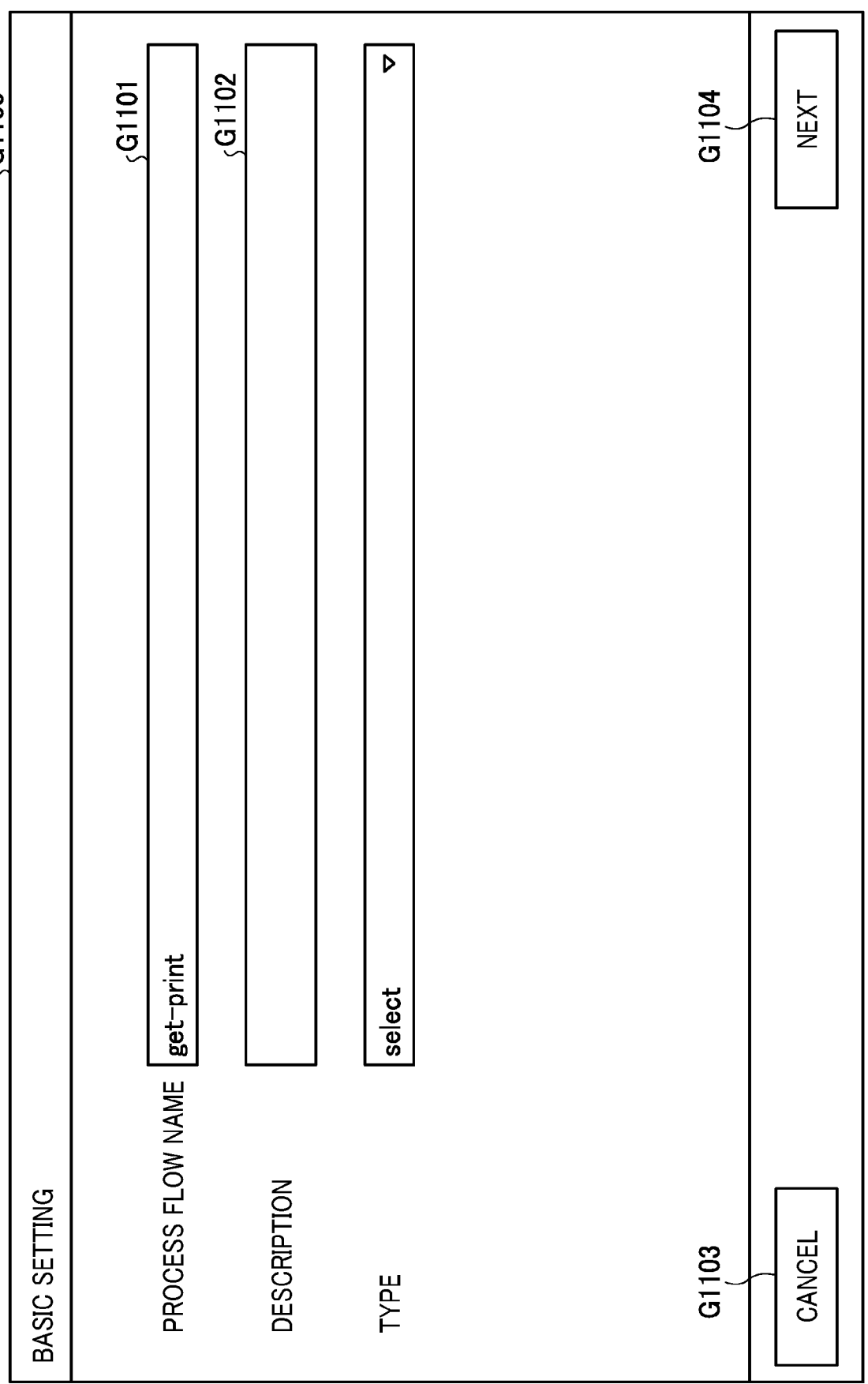
FIG. 22 is a diagram illustrating an example of a process flow basic setting screen, according to the second embodiment.

The process flow basic setting screen G1100 illustrated in FIG. 22 includes a "process flow name" input setting field G1101 for setting the name of a process flow; and a "description" input setting field G1102 for setting the description of the process flow. The process flow basic setting screen G1100 illustrated in FIG. 22 further includes a "cancel" button G1103 for canceling the input details for various settings; and a "next" button G1104 for transitioning to the next screen.

Hereinafter, it is assumed that the user performs an operation to input the process flow name as illustrated on the process flow basic setting screen G1100 in FIG. 22 and then press the "next" button G1104. The browser 310 accepts the operation and displays, for example, the application setting information 1200 illustrated in FIG. 23.

Figure 23:
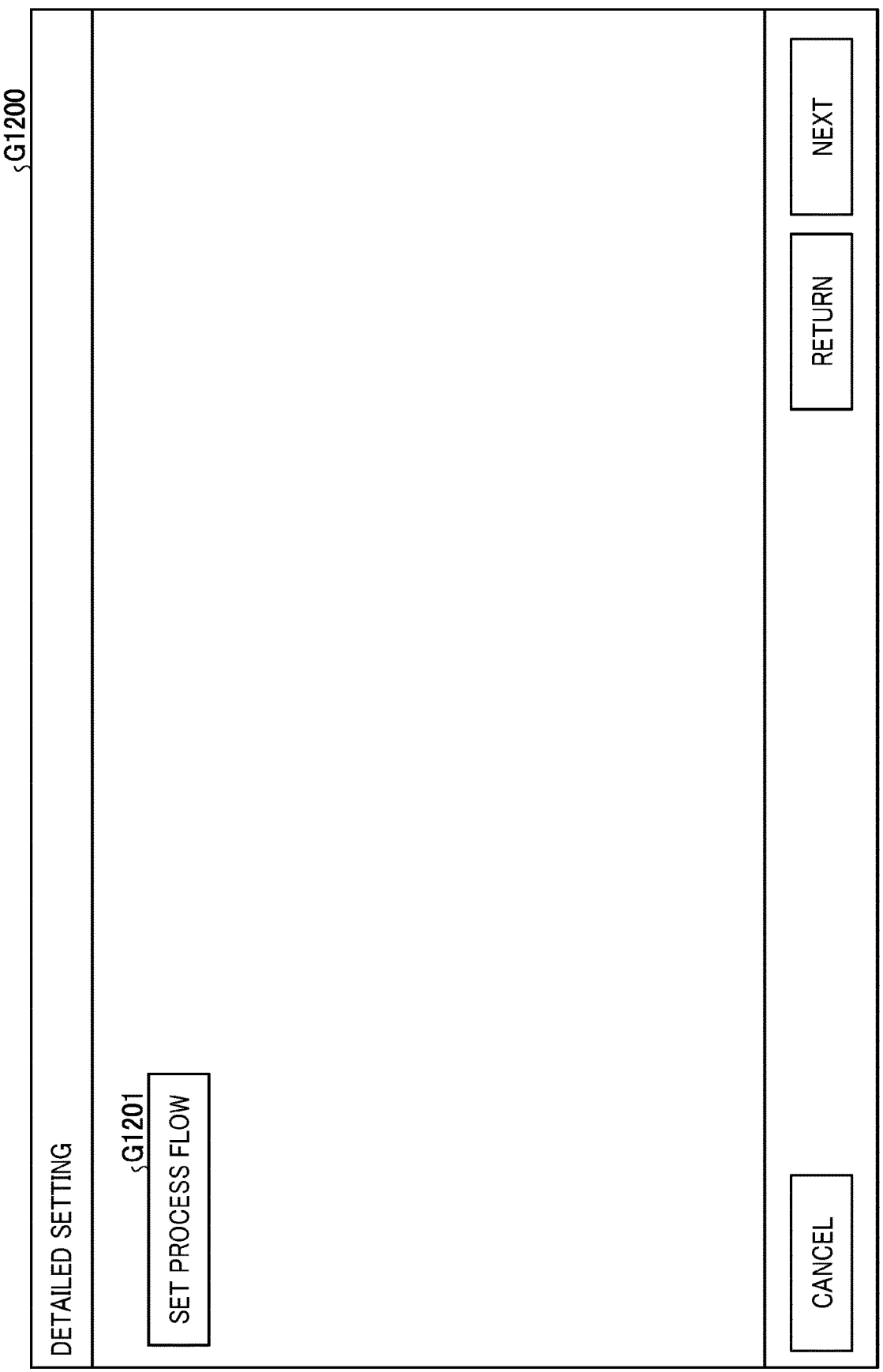
FIG. 23 is a diagram illustrating an example of a process flow detailed setting screen, according to the second embodiment.

A process flow detailed setting screen G1200 illustrated in FIG. 23 is a screen for the user to make the specific setting for the process flow to be registered as the detailed setting of the process flow.

The process flow detailed setting screen G1200 illustrated in FIG. 23 includes a "process flow setting" button G1201 for setting a new process flow.

Hereinafter, it is assumed that the user performs an operation to press the "process flow setting" button G1201. The browser 310 accepts the operation and displays, for example, a process flow setting screen G1300 illustrated in FIG. 24.

Figure 24:
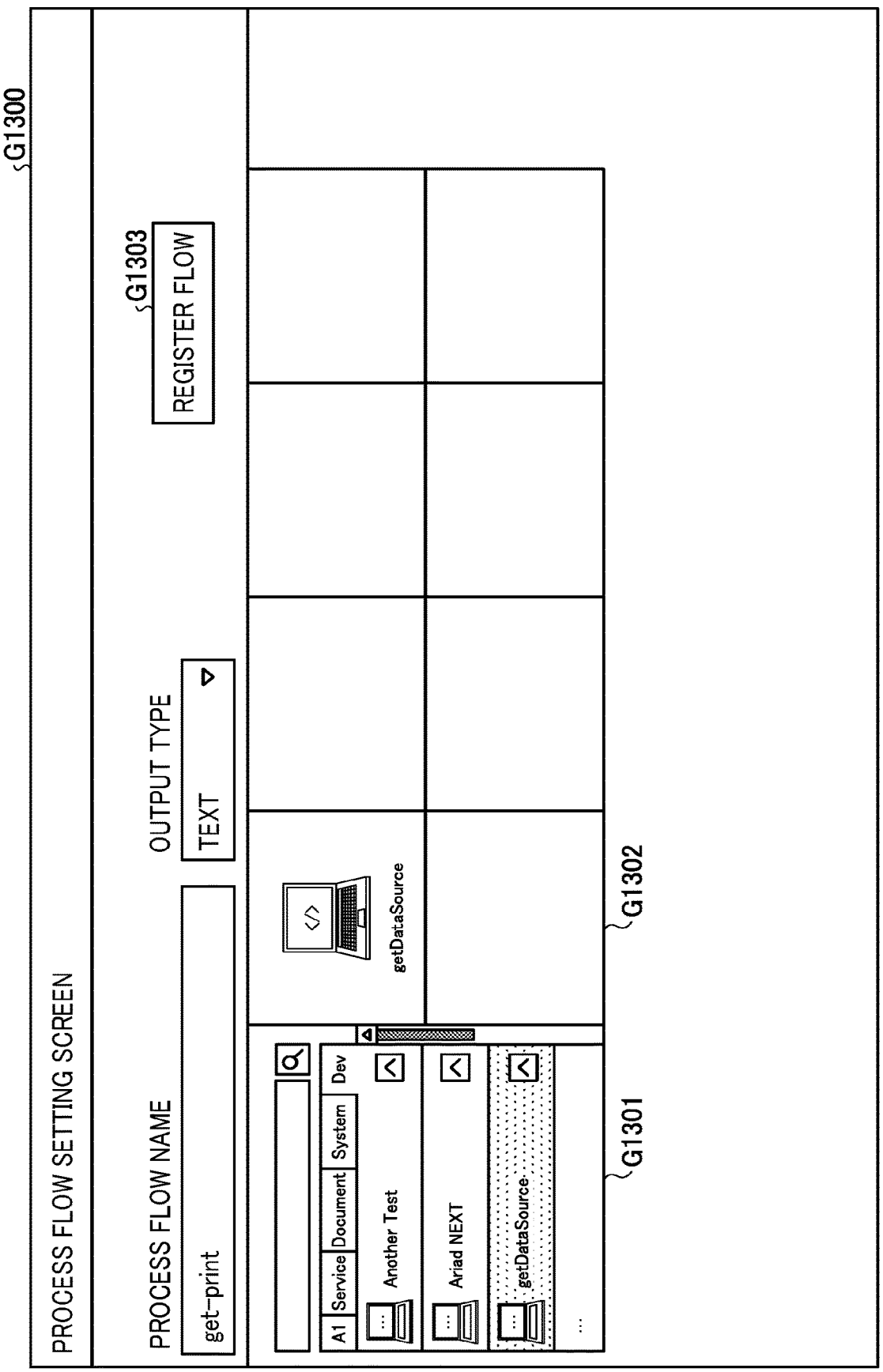
FIG. 24 is a diagram illustrating an example of a process flow setting screen, according to the second embodiment.

The process flow setting screen G1300 illustrated in FIG. 24 is a screen for setting the specific configuration of the process flow to be registered and each process.

The process flow setting screen G1300 illustrated in FIG. 24 includes: a component list G1301 that is a list of various components included in the process flow; a component configuration part G1302 that illustrates the configuration of a component included in the process flow; and a "flow registration" button G1303 for setting the configuration of the process flow with the contents configured in the component configuration part G1302. On the process flow setting screen G1300, the name of the process flow to be registered may be set. In the example illustrated in FIG. 24, "get-print" is set.

In the example illustrated in FIG. 24, the component "getDataSource" for acquiring a document from an external data source is set in the component configuration part G1302 from the component list G1301. For example, the user may perform an operation to double-click any of the components displayed in the component list G1301 so as to set the component in the component configuration part G1302.

Hereinafter, it is assumed that the user performs an operation to press the "flow registration" button G1303 while "getDataSource" is set in the component configuration part G1302 as illustrated on the process flow setting screen G1300 in FIG. 24. The browser 310 accepts the operation and displays, for example, a process flow detailed setting screen G1400 illustrated in FIG. 25.

Figure 25:
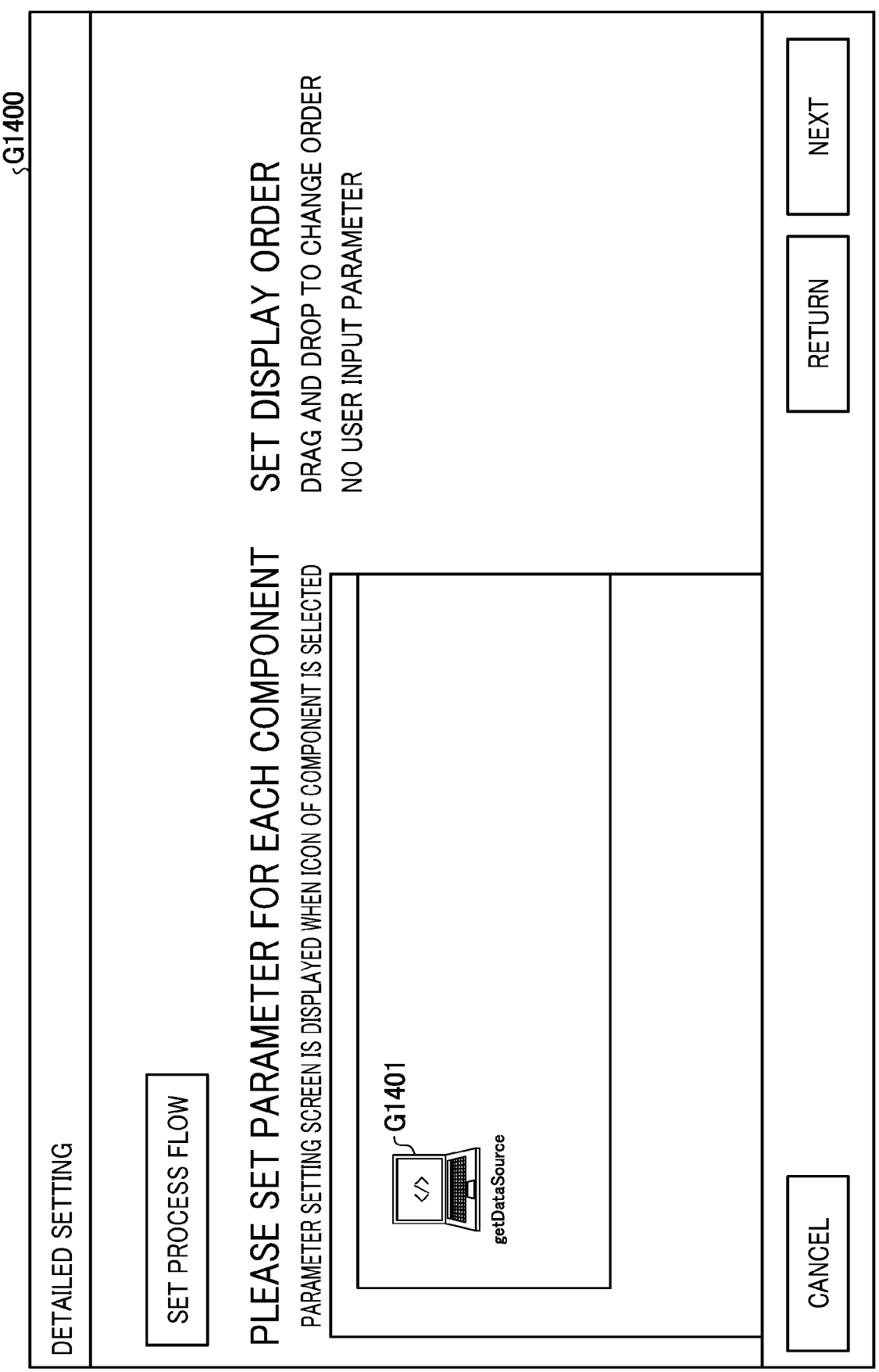
FIG. 25 is a diagram illustrating an example of the process flow detailed setting screen in which a component is set, according to the second embodiment.

The process flow detailed setting screen G1400 illustrated in FIG. 25 includes, for example, a component icon G1401 indicating the component that is set on the process flow setting screen G1300 so as to be included in the process flow.

Hereinafter, it is assumed that the user performs an operation (e.g., click operation or double-click operation) to select the component icon G1401. The browser 310 accepts the operation and displays, for example, a parameter setting screen G1500 illustrated in FIG. 26.

Figure 26:
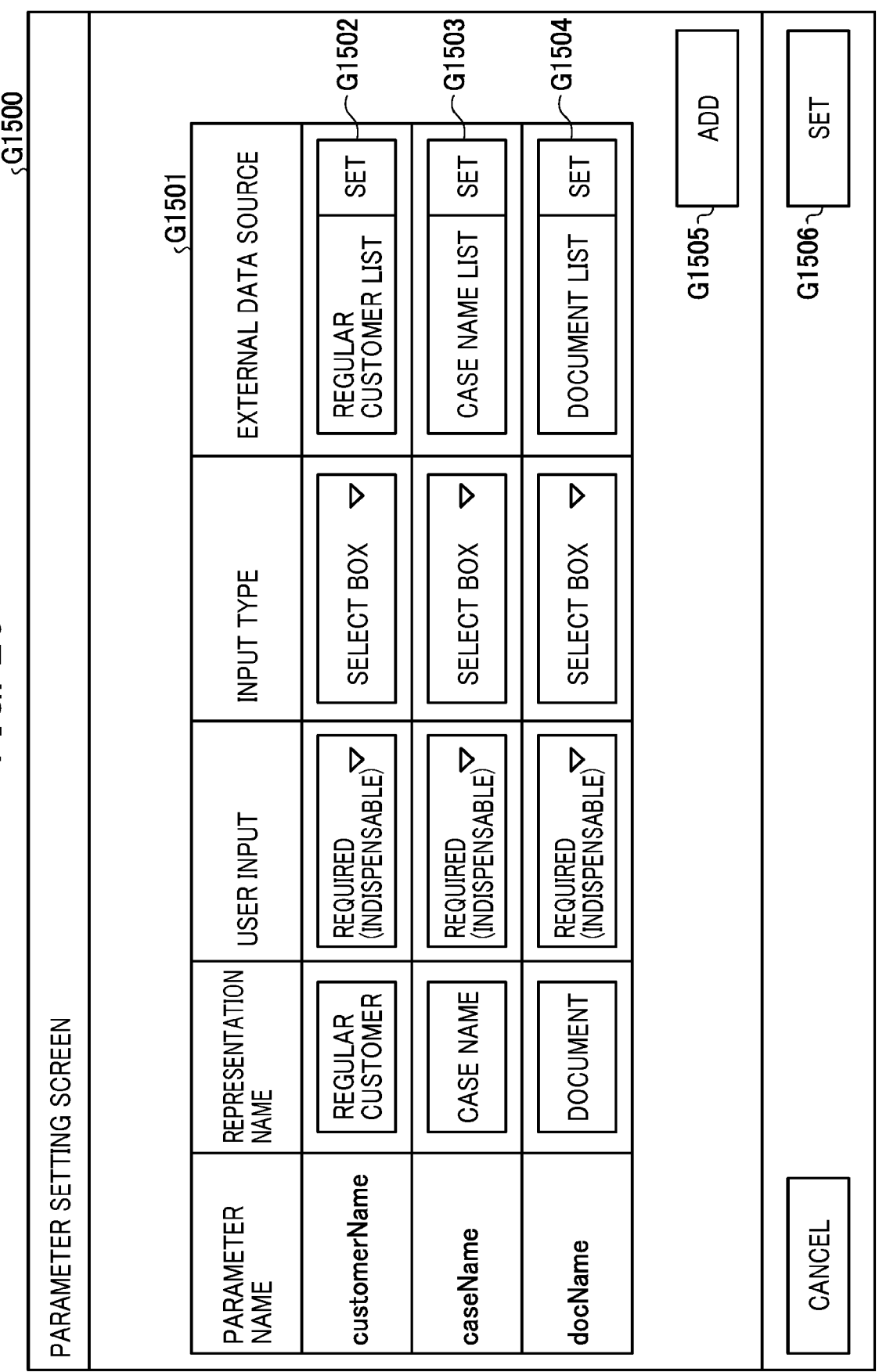
FIG. 26 is a diagram illustrating an example of a parameter setting screen, according to the second embodiment.

The parameter setting screen G1500 illustrated in FIG. 26 is a screen for setting the specific parameter of a component included in the process flow.

The parameter setting screen G1500 illustrated in FIG. 26 includes an input setting list G1501 of input items that are set for selecting a document from the external data source. In the example illustrated in FIG. 26, as the input items for selecting a document from the external data source, three items with the input item (parameter) names "customerName", "caseName", and "docName" are set in the input setting list G1501. Although three items are set as input items in the example illustrated in FIG. 26, this is not a limitation, and one or more input items may be set.

In the input setting list G1501, various settings may be configured, such as "representation name" indicating how each parameter is represented, "user input" for making the setting as to whether the user is required to provide input, "input type" for setting the input method by the user, and "external data source" for making the reference setting to an external data source. In the example illustrated in FIG. 26, as the settings for "representation name", "regular customer" is set for "customerName", "case name" for "caseName", and "document" for "docName". As the settings for "user input", "required (indispensable)" is set for all of "customerName", "caseName" and "docName". As the settings for "input type", "select box" is set for all of "customerName", "caseName", and "docName". Examples of the settings for "input type" include "direct input" in addition to "select box". As the reference setting to "external data source", "regular customer list" is set for "customerName", "case name list" for "caseName", and "document list" for "docName".

The parameter setting screen G1500 illustrated in FIG. 26 includes a "setting" button G1502 for making the reference setting for the input item with the parameter name "customerName"; a "setting" button G1503 for making the reference setting for the input item with the parameter name "caseName"; and a "setting" button G1504 for making the reference setting for the input item with the parameter name "docName". The reference settings in a case where the "setting" buttons G1502 to G1504 are pressed are described later in FIGS. 28 to 32.

The parameter setting screen G1500 illustrated in FIG. 26 includes an "add" button G1505 for adding an input item to the input setting list G1501, and a "setting" button G1506 for determining the details set for each input item.

Hereinafter, it is assumed that the user performs an operation to press the "setting" button G1506. The browser 310 accepts the operation and displays, for example, a process flow detailed setting screen G1600 illustrated in FIG. 27.

Figure 27:
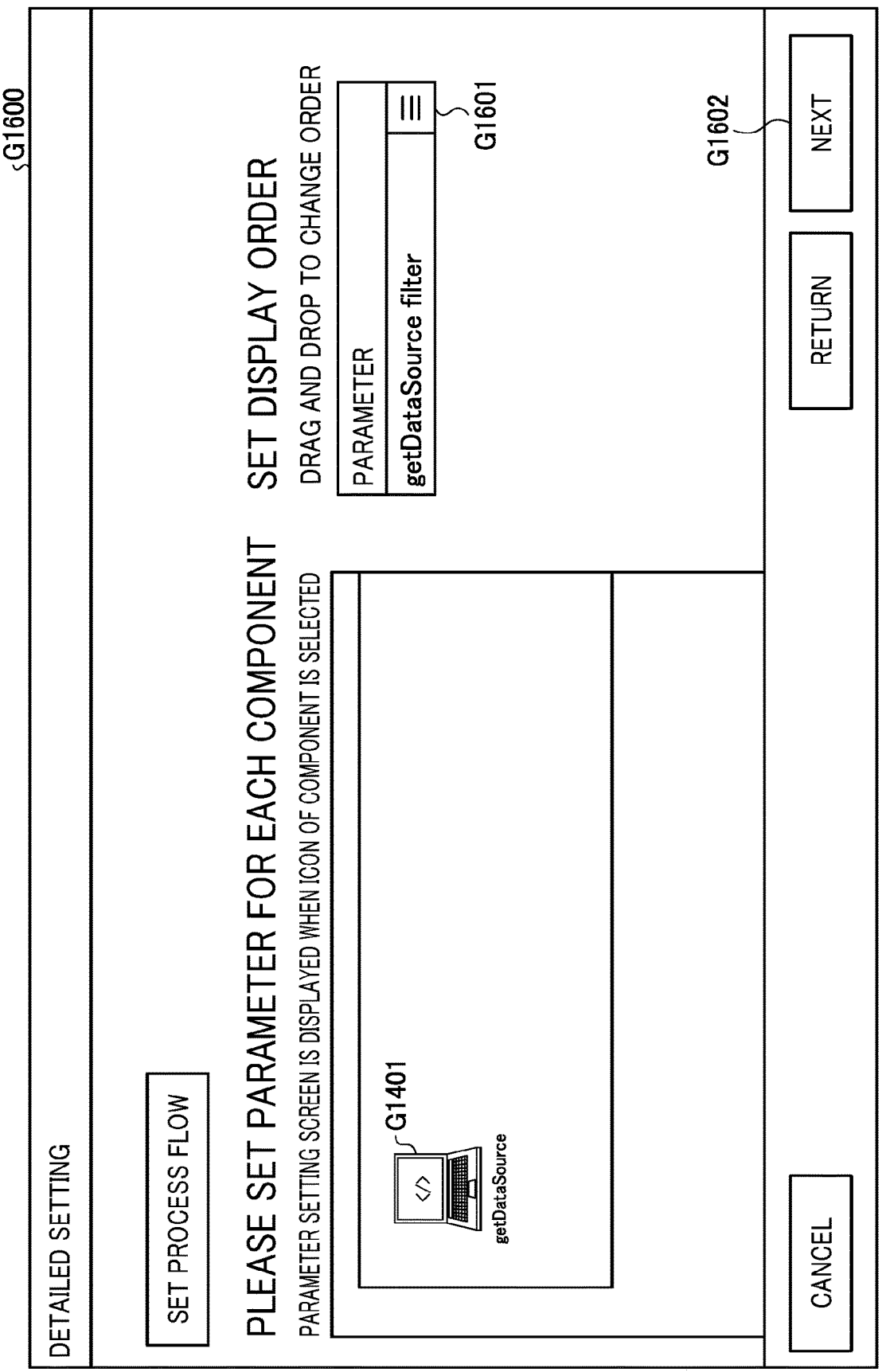
FIG. 27 is a diagram illustrating an example of the process flow detailed setting screen in which a parameter setting is configured, according to the second embodiment.

The process flow detailed setting screen G1600 illustrated in FIG. 27 includes a display order setting button G1601 for setting the display order with regard to "getDataSource" for which the parameters have been set.

Next, referring to FIGS. 28 to 32, the operation for the reference setting with regard to each input item in the input setting list G1501 on the parameter setting screen G1500 illustrated in FIG. 26 is described. First, it is assumed that the user performs an operation to press the "setting" button G1502 on the parameter setting screen G1500 to make the reference setting for the parameter name "customerName" (hereinafter sometimes simply referred to as the parameter "regular customer"). The browser 310 accepts the operation and displays, for example, an external data source setting screen G1700 illustrated in FIG. 28.

Figure 28:
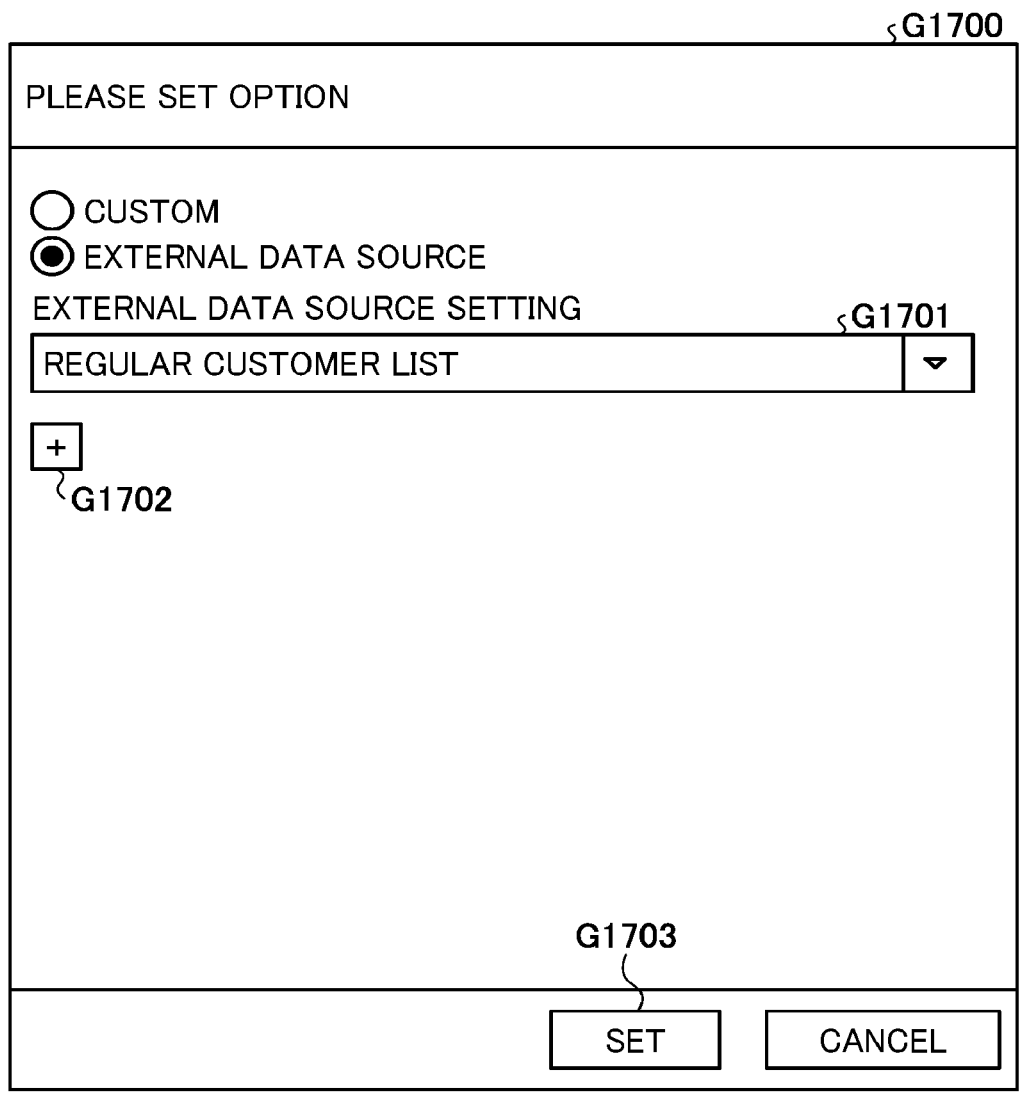
FIG. 28 is a diagram illustrating an example of an external data source setting screen, according to the second embodiment.

The external data source setting screen G1700 illustrated in FIG. 28 includes: an external data source setting field G1701 for setting the external data source to be referred to; and a reference addition button G1702 for additionally setting the parameter to be referred to (the parameter to be depended on). On the external data source setting screen G1700 illustrated in FIG. 28, the setting is configured such that "regular customer list" is referred to as the reference external data source. Here, "regular customer list" is the customer information 1810 that associates the user (the user who logs in to the information processing system 1*a*) and the user's regular customer as described above in FIG. 19.

The external data source setting screen G1700 illustrated in FIG. 28 includes a "setting" button G1703 for confirming the details of the reference setting on the external data source setting screen G1700. The user presses the "setting" button G1703 to confirm the setting such that "regular customer list" (the customer information 1810), which is an external data source, is to be referred to for the parameter "regular customer", and the browser 310 displays the parameter setting screen G1500 illustrated in FIG. 26.

Then, it is assumed that the user performs an operation to press the "setting" button G1503 on the parameter setting screen G1500 to set the reference setting for the parameter name "caseName" (hereinafter sometimes simply referred to as the parameter "case name"). The browser 310 accepts the operation and displays, for example, an external data source setting screen G1710 illustrated in FIG. 29.

Figure 29:
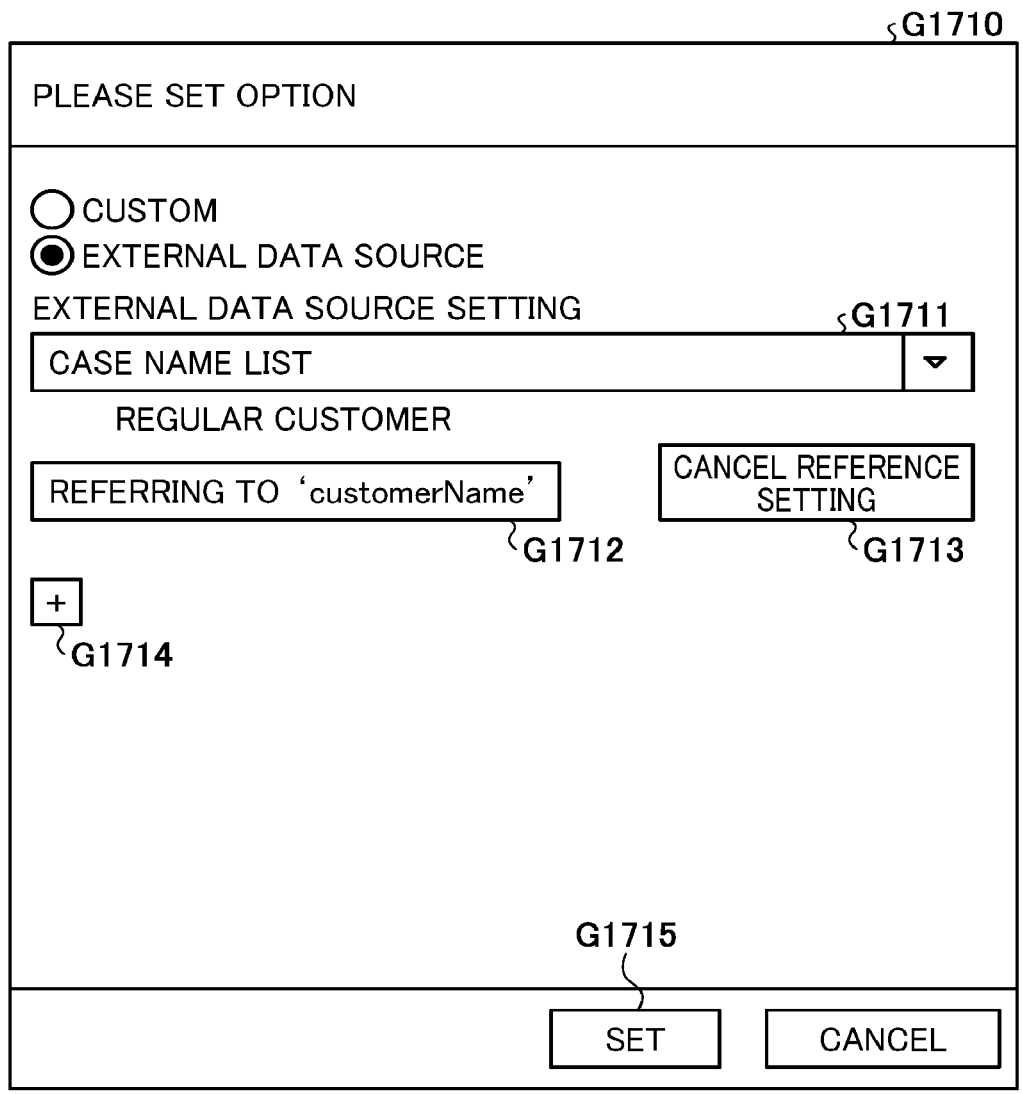
FIG. 29 is a diagram illustrating an example of the external data source setting screen on which a reference setting is configured, according to the second embodiment.

The external data source setting screen G1710 illustrated in FIG. 29 includes: an external data source setting field G1711 for setting the external data source to be referred to; a reference addition button G1714 for additionally setting the parameter to be referred to (the parameter to be depended on); and a "setting" button G1715 for confirming the details of the reference setting. On the external data source setting screen G1710 illustrated in FIG. 29, the setting is configured such that "case name list" is referred to as the reference external data source. Here, "case name list" is the case name information 1820 that associates the customer with the name of the case belonging to the customer, as described above in FIG. 19.

Here, it is assumed that the user performs an operation to press the reference addition button G1714 on the external data source setting screen G1710 illustrated in FIG. 29. The browser 310 accepts the operation and displays, for example, a parameter reference setting screen G1720 illustrated in FIG. 30A.

Figure 30A:
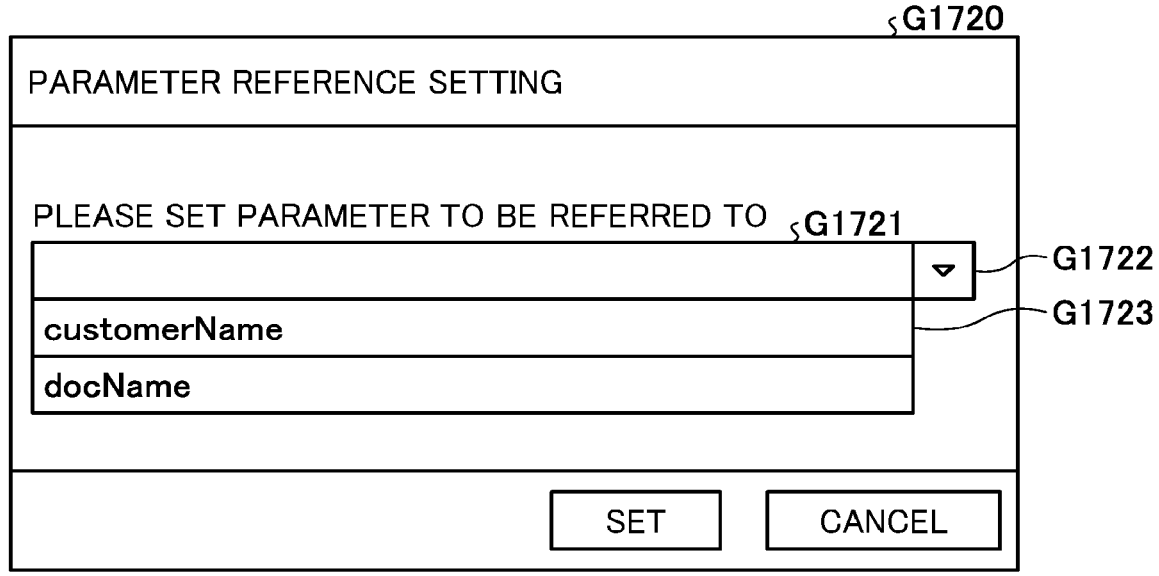
FIGS. 30A and 30B are diagrams illustrating an example of a parameter reference setting screen, according to the second embodiment.
Figure 30B:
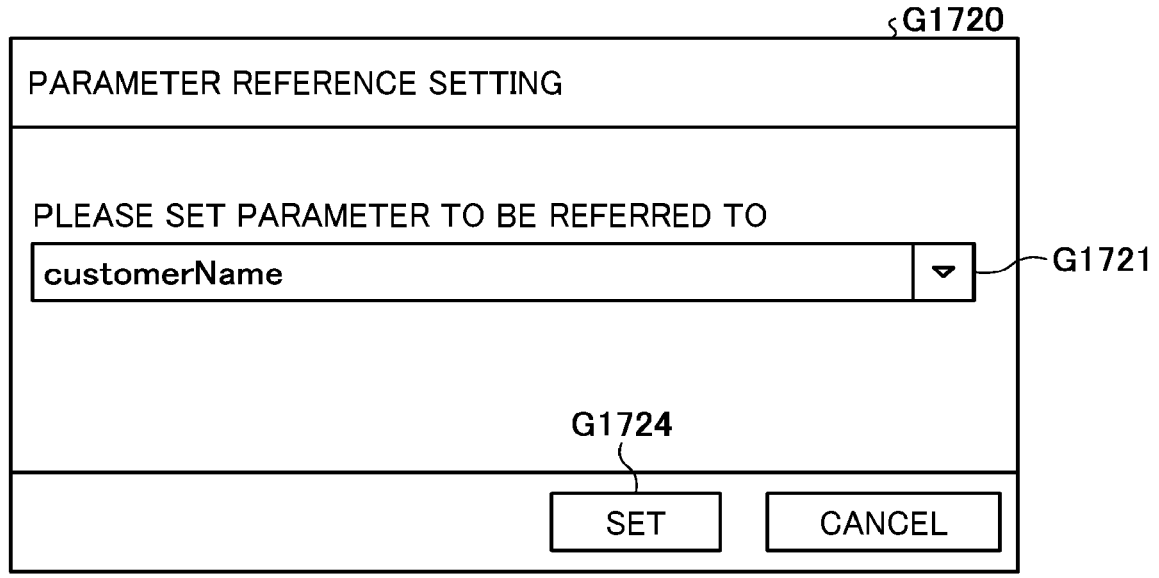

The parameter reference setting screen G1720 illustrated in FIG. 30A is a screen for setting the parameter on which the parameter "case name" depends. The parameter reference setting screen G1720 illustrated in FIG. 30A includes: a reference parameter input field G1721 for inputting a parameter on which the parameter "case name" depends; and a pull-down button G1722 for displaying the parameters that are input candidates for the reference parameter input field G1721 by using a pull-down menu. When the user presses the pull-down button G1722, a pull-down G1723 displaying the list of parameters that are input candidates for the reference parameter input field G1721 is displayed, as illustrated in FIG. 30A. In the example illustrated in FIG. 30A, the parameters "customerName" and "docName" other than the parameter "case name" are displayed as the dependency target parameter. When "customerName" is selected, "customerName" is input in the reference parameter input field G1721, as illustrated in FIG. 30B. The parameter reference setting screen G1720 further includes a "setting" button G1724 to confirm the setting of the dependency target parameter input in the reference parameter input field G1721.

Here, it is assumed that the user performs an operation to press the "setting" button G1724 on the parameter reference setting screen G1720 illustrated in FIG. 30B. The browser 310 accepts the operation and displays the external data source setting screen G1710 including a setting reference field G1712 indicating that the reference setting for the dependency target parameter is configured and a "reference setting cancel" button G1713 to cancel the reference setting, as illustrated in FIG. 29. On the external data source setting screen G1710 illustrated in FIG. 29, the parameter "case name" refers to "case name list" as an external data source, and the parameter "regular customer" is set as a parameter which the parameter "case name" refers to (depends on).

It is assumed that the user performs an operation to press the "setting" button G1715 on the external data source setting screen G1710 illustrated in FIG. 29. Accordingly, the settings are confirmed such that the parameter "case name" refers to "case name list" (the case name information 1820) that is an external data source and the parameter "regular customer" is set as the parameter which the parameter "case name" refers to (depends on). The browser 310 displays the parameter setting screen G1500 illustrated in FIG. 26.

Here, it is assumed that the user performs an operation to press the "setting" button G1504 on the parameter setting screen G1500 to make the reference setting for the parameter name "docName" (hereinafter sometimes simply referred to as the parameter "document"). The browser 310 accepts the operation and displays, for example, an external data source setting screen G1730 illustrated in FIG. 31.

The external data source setting screen G1730 illustrated in FIG. 31 includes an external data source setting field G1731, a reference addition button G1736, and a "setting" button G1737. The external data source setting field G1731 is a setting field for setting the external data source to be referred to. The reference addition button G1736 is a button for additionally setting the parameter to be referred to (the parameter to be depended on). The "setting" button G1737 is a button for confirming the details of the reference setting. On the external data source setting screen G1730 illustrated in FIG. 31, "document list" is set as the external data source to be referred to. Here, "document list" is the information that associates the name of a case and a document, as described above in FIG. 19.

Here, it is assumed that the user performs an operation to press the reference addition button G1736 on the external data source setting screen G1730 illustrated in FIG. 31. The browser 310 accepts the operation and displays, for example, a parameter reference setting screen G1740 illustrated in FIG. 32.

Figure 32:
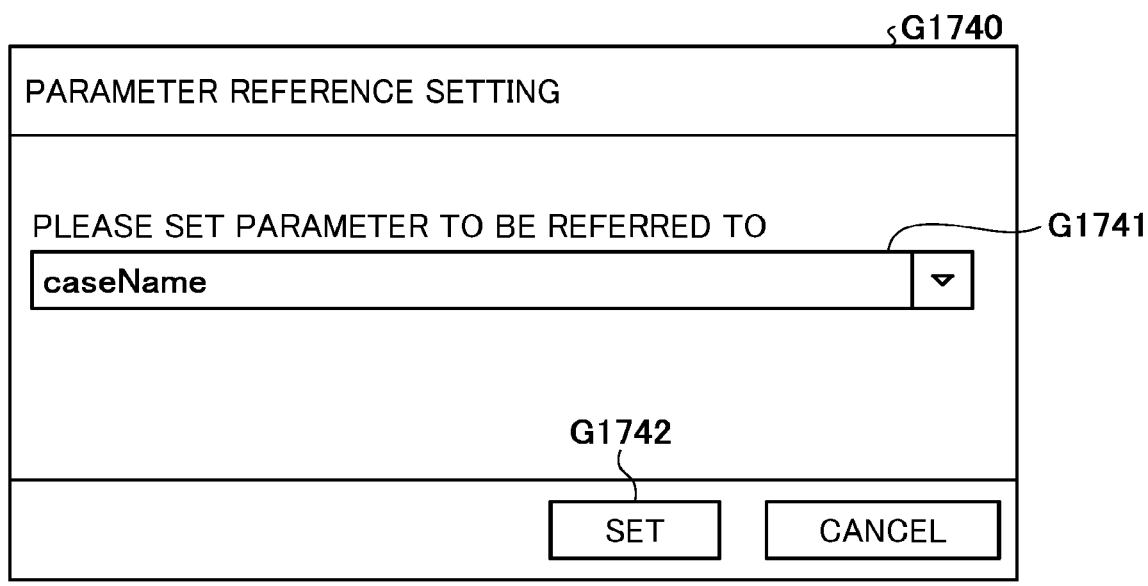
FIG. 32 is a diagram illustrating an example of the parameter reference setting screen, according to the second embodiment.

The parameter reference setting screen G1740 illustrated in FIG. 32 is a screen for setting the parameter on which the parameter "document" depends. The parameter reference setting screen G1740 illustrated in FIG. 32 includes a reference parameter input field G1741 for inputting a parameter on which the parameter "case name" depends. When the user performs an operation to select "caseName" from the pull-down menu on the parameter reference setting screen G1740, "caseName" is input to the reference parameter input field G1721, as illustrated in FIG. 32. The parameter reference setting screen G1740 further includes a "setting" button G1742 for confirming the setting of the dependency target parameter input to the reference parameter input field G1741.

Here, it is assumed that the user performs an operation to press the "setting" button G1742 on the parameter reference setting screen G1740 illustrated in FIG. 32. The browser 310 accepts the operation and displays the external data source setting screen G1730 including a setting reference field G1734 and a "reference setting cancel" button G1735, as illustrated in FIG. 31. The setting reference field G1734 indicates that the reference setting for the dependency target parameter is configured. The "reference setting cancel" button G1735 is a button for canceling the reference setting. On the external data source setting screen G1730 illustrated in FIG. 31, the parameter "document" refers to "document list" that is an external data source, and the parameter "case name" is set as a parameter which the parameter "document" refers to (depends on).

It is assumed that, in the same setting procedure, the external data source setting screen G1730 displays a setting reference field G1732 indicating that the reference setting for the dependency target parameter is configured and a "reference setting cancel" button G1733 for canceling the reference setting, as illustrated in FIG. 31. Specifically, on the external data source setting screen G1730 illustrated in FIG. 31, the parameter "regular customer" is further set as the parameter which the parameter "document" refers to (depends on).

Here, it is assumed that the user performs an operation to press the "setting" button G1737 on the external data source setting screen G1730 illustrated in FIG. 31. Accordingly, the settings are confirmed such that the parameter "document" refers to "document list" that is an external data source and the parameter "regular customer" and the parameter "case name" are set as the parameters which the parameter "document" refers to (depends on). The browser 310 displays the parameter setting screen G1500 illustrated in FIG. 26.

Hereinafter, it is assumed that the user performs an operation to press the "setting" button G1506. The browser 310 accepts the operation and displays the process flow detailed setting screen G1600 illustrated in FIG. 27 as described above.

The process flow detailed setting screen G1600 illustrated in FIG. 27 further includes a "next" button G1602 for confirming the reference setting set in the parameter setting screen G1500 illustrated in FIG. 26.

Here, it is assumed that the user performs an operation (process flow registration operation) to press the "next" button G1602. Then, the browser 310 accepts the process flow registration operation (Step S910).

In response to the accepted process flow registration operation, the browser 310 generates the process flow information 1100 (an example of the setting information) including various setting details that are set at Step S909 (Step S911). The process flow information 1100 may include information that defines the execution order of each selected component (program), and the application setting information 1200 (an example of the setting information) corresponding to the process flow information 1100 may include various setting details that are set at Step S909.

After generating the process flow information 1100, the browser 310 transmits a process flow registration request to the flow registration unit 143 of the portal service unit 140 (Step S912). The process flow registration request includes the process flow information 1100 generated at Step S911.

In response to the received process flow registration request, the flow registration unit 143 of the portal service unit 140 transmits the process flow registration request to the flow management unit 113 of the I/O service processing unit 110a (Step S913).

In response to the received process flow registration request, the flow management unit 113 of the I/O service processing unit 110a registers the process flow (Step S914). Then, the flow management unit 113 returns the registration result to the browser 310.

That is, the flow management unit 113 stores the process flow information 1100 included in the process flow registration request in the application information storage unit 150.

After the process flow is registered (the process flow information 1100 is registered) as described above, "acquired document printing application" is registered in the same manner as the application registration procedure described above in FIGS. 8 to 16. As a result, the application information 1000 including the application setting information 1200 and the process flow information 1100 with the flow name defined in the flow name 1205 of the application setting information 1200 is registered in the service provision system 10a.

As described above, with the information processing system 1a according to the present embodiment, the user may use the PC terminal 30 to register the process flow in the service provision system 10a. Furthermore, with the information processing system 1a according to the present embodiment, the user may use the PC terminal 30 to set, for example, the flow name and the parameter information on each component so as to easily register the process flow (the process flow information 1100).

Therefore, with the information processing system 1a according to the present embodiment, for example, even a user (such as a planner) who does not have specialized knowledge, such as a programming language, or experience may register the process flow (the process flow information 1100) for registering an application (the application information 1000) for providing various services.

Figure 33:
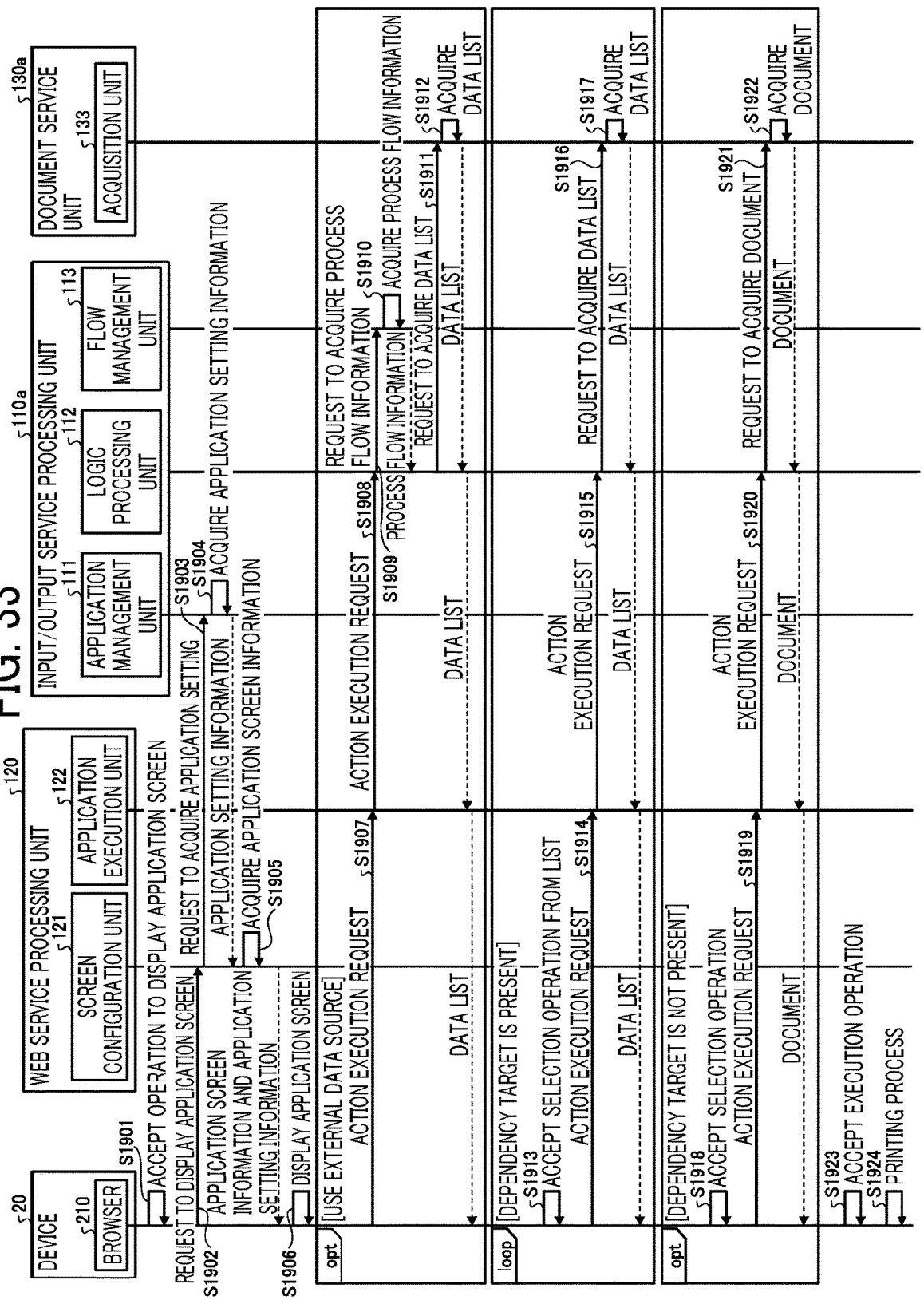
FIG. 33 is a sequence diagram illustrating an example of the overall process that is performed when using an acquired document printing service, according to the second embodiment.

FIG. 33 is a sequence diagram illustrating an example of the overall process to use the acquired document printing service. Referring to FIG. 33, a case where the user of the device 20 uses the acquired document printing service is described.

First, the browser 210 of the device 20 accepts an operation (display operation) to display the application screen of the acquired document printing service (Step S1901). For example, the user of the device 20 may input the URL of the application screen of the acquired document printing service to the address bar in the browser 310 to perform the application screen display operation.

In response to the accepted operation to display the application screen of the acquired document printing service, the browser 210 of the device 20 transmits the request for displaying the application screen of the acquired document printing service to the screen configuration unit 121 (first reception means) of the web service processing unit 120 (Step S1902). The request for displaying the application screen of the acquired document printing service includes the application ID of the application information 1000 for providing the acquired document printing service.

In response to the received request for displaying the application screen of the acquired document printing service, the screen configuration unit 121 of the web service processing unit 120 transmits an application setting acquisition request to the application management unit 111 of the I/O service processing unit 110a (Step S1903). The application setting acquisition request includes the application ID of the application information 1000 for providing the acquired document printing service.

In response to the received application setting acquisition request, the application management unit 111 of the I/O service processing unit 110a acquires the application setting information 1200 stored in association with the application ID included in the application setting acquisition request from the application information storage unit 150 (Step S1904). Then, the application management unit 111 returns the application setting information 1200 acquired from the application information storage unit 150 to the screen configuration unit 121.

Subsequently, the screen configuration unit 121 of the web service processing unit 120 acquires, from the application screen information storage unit 160, the application screen information 2000 (use screen information) stored in association with the application ID of the application information 1000 for providing the acquired document printing service (Step S1905). Then, the screen configuration unit 121 (first transmission means) returns, to the browser 210, the application screen information 2000 acquired from the application screen information storage unit 160 and the application setting information 1200 returned at Step S1904 described above.

Figure 34:
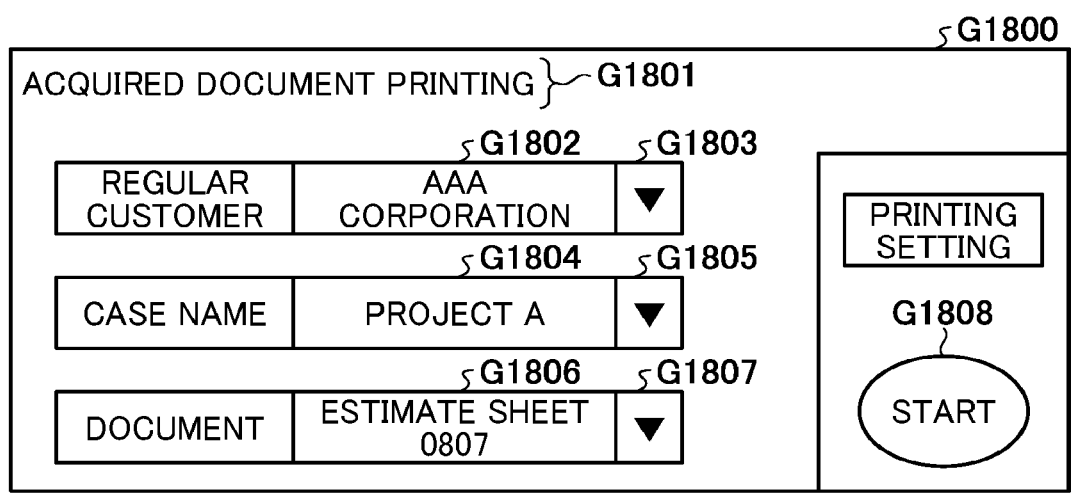
FIG. 34 is a diagram illustrating an example of an application screen of the acquired document printing application, according to the second embodiment.

The browser 210 of the device 20 displays, for example, an application screen G1800 illustrated in FIG. 34 based on the application screen information 2000 and the application setting information 1200 received from the screen configuration unit 121 (Step S1906). The application screen G1800 illustrated in FIG. 34 is a screen for the user of the device 20 to use the acquired document printing service.

The application screen G1800 illustrated in FIG. 34 includes an application name G1801, a regular customer input field G1802, a regular customer pull-down button G1803, a case name input field G1804, a case name pull-down button G1805, a document input field G1806, a document pull-down button G1807, and a "start" button G1808.

The application name G1801 is displayed based on the information corresponding to the application display name 1203 in the application setting information 1200. In a case where application names (titles) in multiple languages are defined in the application display name 1203, the application name in the language corresponding to the language setting of the browser 210 is displayed in the application name G1801.

The representation names in the regular customer input field G1802, the case name input field G1804, and the document input field G1806 are included in the process flow information 1100, and the representation names that are input and set on the parameter setting screen G1500 illustrated in FIG. 26 are displayed.

The input methods for the regular customer input field G1802, the case name input field G1804, and the document input field G1806 and the operations for the displayed details of the regular customer pull-down button G1803, the case name pull-down button G1805, and the document pull-down button G1807 are based on the details of the process flow that is set in FIGS. 26 to 32.

As described above, the application screen for the user of the device 20 to use a service displays the application name and parameter input areas based on the information defined in the process flow information 1100 and the application setting information 1200.

After the browser 210 causes the application screen G1800 to be displayed, the browser 210 transmits an action execution request for acquiring the process flow information 1100 associated with the acquired document printing application on the application screen G1800 to the application execution unit 122 of the web service processing unit 120 (Step S1907). The action execution request includes the flow name "get-print" defined in the flow name 1205 of the application setting information 1200 and the parameter setting information.

In response to the received action execution request, the application execution unit 122 of the web service processing unit 120 transmits the action execution request to the logic processing unit 112 of the I/O service processing unit 110a (Step S1908).

First, in response to the received action execution request from the application execution unit 122, the logic processing unit 112 transmits a process flow information acquisition request to the flow management unit 113 (Step S1909). The process flow information acquisition request includes the flow name "get-print".

In response to the received process flow acquisition request, the flow management unit 113 acquires the process flow information 1100 with the flow name "get-print" included in the process flow acquisition request from the application information storage unit 150 (Step S1910). Then, the flow management unit 113 returns the process flow information 1100 acquired from the application information storage unit 150 to the logic processing unit 112.

The logic processing unit 112 transmits, to the acquisition unit 133 of the document service unit 130a, a data list acquisition request for acquiring the information on an external data source for the input item for which the reference setting as a dependency target is not configured with regard to a different input item and the reference setting (use setting) to the external data source is configured among the input items on the application screen G1800 in accordance with the details of the process flow information 1100 acquired from the flow management unit 113 (Step S1911). The data list acquisition request includes the information (e.g., user name) on the user who has logged in to the information processing system 1a. Specifically, among the input items on the application screen G1800, the parameter "regular customer" corresponds to the input item for which the reference setting as a dependency target is not configured with regard to a different input item and the reference setting (use setting) to an external data source is configured. As described above, for the parameter "regular customer", the setting is configured such that "regular customer list" is referred to as an external data source.

In response to the received data list acquisition request, the acquisition unit 133 of the document service unit 130a accesses the external customer information storage unit 180 to acquire the data list of regular customers associated with the user who has logged in to the information processing system 1a from the customer information 1810 (Step S1912). Then, the acquisition unit 133 returns the acquired data list of regular customers to the logic processing unit 112. The logic processing unit 112 returns the received data list to the application execution unit 122. Further, the application execution unit 122 returns the data list to the browser 210. The browser 210 causes the received data list of regular customers to be pulled down due to the pressing on the regular customer pull-down button G1803 on the application screen G1800.

Specifically, in the device 20, when the user causes the application screen G1800 to be displayed, the regular customer input field G1802, which is the uppermost input field on the application screen G1800, may display the list of regular customers associated with the user by using a pull-down menu. Therefore, the user may refrain from directly inputting the regular customer related to (associated with) the user and may simply select the desired regular customer from the pull-down menu.

The user performs an operation to select the desired regular customer from the list of regular customers displayed due to the pressing on the regular customer pull-down button G1803 (Step S1913). Accordingly, the selected regular customer is displayed in the regular customer input field G1802. For the input item in the regular customer input field G1802, the reference setting as a dependency target is configured with regard to a different input item (the parameter "case name" (an example of a second input item)) and the reference setting to an external data source is configured for the different input item. Therefore, the browser 210 transmits an action execution request for acquiring the information on the external data source to the application execution unit 122 of the web service processing unit 120 (Step S1914). The action execution request includes the information on the regular customer input to the regular customer input field G1802.

In response to the received action execution request, the application execution unit 122 of the web service processing unit 120 transmits the action execution request to the logic processing unit 112 of the I/O service processing unit 110a (Step S1915).

The logic processing unit 112 transmits, to the acquisition unit 133 of the document service unit 130a, the data list acquisition request (an example of a first acquisition request) for acquiring the information on an external data source for the input item (the parameter "case name") for which the reference setting as a dependency target is configured with regard to a different input item (the parameter "regular customer" (an example of a first input item)) and the reference setting to the external data source is configured in accordance with the details of the process flow information 1100 acquired from the flow management unit 113 (Step S1916). The data list acquisition request includes the information (an example of a first item detail) on the regular customer input to the regular customer input field G1802. Specifically, among the input items on the application screen G1800, the parameter "case name" corresponds to the input item for which the reference setting as a dependency target is configured with regard to a different input item and the reference setting to an external data source is configured. As described above, for the parameter "case name", the setting is configured such that "case name list" is referred to as an external data source.

In response to the received data list acquisition request, the acquisition unit 133 of the document service unit 130*a* accesses the external customer information storage unit 180. Subsequently, the acquisition unit 133 acquires the data list (an example of list information) of the case name associated with the regular customer input to the regular customer input field G1802 from the case name information 1820 (Step S1917). Then, the acquisition unit 133 returns the acquired data list of case names to the logic processing unit 112. The logic processing unit 112 returns the received data list to the application execution unit 122. The application execution unit 122 further returns the data list to the browser 210. The browser 210 causes the received data list of case names to be pulled down due to the pressing on the case name pull-down button G1805 on the application screen G1800.

Specifically, in the device 20, when the user selects and inputs the desired regular customer to the regular customer input field G1802 on the application screen G1800, the case name input field G1804, which is the second input field on the application screen G1800, may display the list of case names associated with the regular customer by using a pull-down menu. Therefore, the user may refrain from directly inputting the case name related to (associated with) the selected regular customer and may simply select the desired case name from the pull-down menu.

At this stage, when the input detail of the regular customer in the regular customer input field G1802 is changed, the operations at Steps S1914 to S1917 after the operation to select the regular customer at Step S1913 described above are automatically performed again.

The user performs an operation to select the desired case name from the list of case names displayed due to the pressing on the case name pull-down button G1805 (Step S1913). Accordingly, the case name input field G1804 displays the selected case name. For the input item in the case name input field G1804, the reference setting as a dependency target is configured with regard to a different input item (the parameter "document (an example of the second input item)") and the reference setting to an external data source is configured for the different input item. Therefore, the browser 210 transmits an action execution request for acquiring the information on the external data source to the application execution unit 122 (an example of a second reception unit) of the web service processing unit 120 (Step S1914). The action execution request includes the information on the case name input to the case name input field G1804.

In response to the received action execution request, the application execution unit 122 of the web service processing unit 120 transmits the action execution request to the logic processing unit 112 of the I/O service processing unit 110*a* (Step S1915).

The logic processing unit 112 transmits, to the acquisition unit 133 of the document service unit 130*a*, the data list acquisition request (an example of the first acquisition request) for acquiring the information on an external data source for the input item (the parameter "document") for which the reference setting as a dependency target is configured with regard to a different input item (the parameter "case name" (an example of the first input item)) and the reference setting to the external data source is configured in accordance with the details of the process flow information 1100 acquired from the flow management unit 113 (Step S1916). The data list acquisition request includes the information (an example of the first item detail and an example of a second item detail) on the case name input to the case name input field G1804. Specifically, among the input items on the application screen G1800, the parameter "document" corresponds to the input item for which the reference setting as a dependency target is configured with regard to a different input item and the reference setting to an external data source is configured. As described above, for the parameter "document", the setting is configured such that "document list" is referred to as an external data source.

In response to the received data list acquisition request, the acquisition unit 133 of the document service unit 130*a* accesses the external document storage unit 190. Then, the acquisition unit 133 acquires the data list (an example of the list information) of documents associated with the case name input to the case name input field G1804 from the information associating the name of a case and a document (Step S1917). As described above in FIG. 31, in a case where the parameter "document" is set as a dependency target for the parameter "case name" and the parameter "regular customer" (an example of a third input item), the acquisition unit 133 may acquire the data list of documents associated with both the case name and the regular customer (an example of a third item detail). Then, the acquisition unit 133 returns the acquired data list of case documents to the logic processing unit 112. The logic processing unit 112 returns the received data list to the application execution unit 122. The application execution unit 122 (an example of a second transmission unit) further returns the data list to the browser 210. The browser 210 causes the received data list of documents to be pulled down due to the pressing on the document pull-down button G1807 on the application screen G1800.

That is, in the device 20, when the user selects and inputs the desired case name to the case name input field G1804 on the application screen G1800, the document input field G1806, which is the lowest input field on the application screen G1800, may display the list of documents associated with the case name by using a pull-down menu. Therefore, the user may refrain from directly inputting the document related to (associated with) the selected case name and may simply select the desired document from the pull-down menu.

The user performs an operation to select the desired document to be printed from the list of documents displayed due to the pressing on the document pull-down button G1807 (Step S1918). Accordingly, the document input field G1806 displays the selected document. As the reference setting as a dependency target is not configured for the input item in the document input field G1806 with regard to a different input item (the parameter "document"), the browser 210 transmits an action execution request for acquiring the selected document to the application execution unit 122 of the web service processing unit 120 (Step S1919). The action execution request includes the information (an example of the second item detail) on the document input to the document input field G1806.

In response to the received action execution request, the application execution unit 122 of the web service processing unit 120 transmits the action execution request to the logic processing unit 112 of the I/O service processing unit 110*a* (Step S1920).

The logic processing unit 112 transmits, to the acquisition unit 133 of the document service unit 130*a*, a document acquisition request (a second acquisition request) for acquiring the information on the selected document in accordance with the details of the process flow information 1100 acquired from the flow management unit 113 (Step S1921). The document acquisition request includes the information (i.e., the document name or the document ID) on the document input to the document input field G1806.

In response to the received document acquisition request, the acquisition unit 133 of the document service unit 130a accesses the external document storage unit 190 to acquire the document indicated by the document information included in the document acquisition request (Step S1922). Then, the acquisition unit 133 returns the acquired document to the logic processing unit 112. The logic processing unit 112 returns the received document to the application execution unit 122. Further, the application execution unit 122 returns the document to the browser 210. The browser 210 may display the content (reduced display, etc.) of the received document.

Here, it is assumed that, on the application screen G1800 illustrated in FIG. 34, the user performs an operation (execution operation) to press the "start" button G1808.

Then, the browser 210 of the device 20 accepts the execution operation (Step S1923). Then, the browser 210 of the device 20 controls the printer 25 to execute the printing process on the received document (Step S1924).

Thus, the series of processes (process flow) based on the process flow information 1100 for the acquired document printing service is completely performed. As a result, the service provision system 10a according to the present embodiment may provide the device 20 with the acquired document printing service.

In the acquired document printing service, as the series of processes that follow, a printing process is executed on the acquired document; however, the printing process is not a limitation depending on the setting of the process flow to be registered. For example, the process to transmit the acquired document to a specific recipient through e-mail may be set in the process flow. In this case, it is possible to provide an acquired document transmission service for transmitting a document acquired from an external data source through e-mail.

As described above, with the information processing system 1a according to the present embodiment, with regard to each input item for acquiring a document used in the application from an external data source, a candidate for the dependency source input item associated with the dependency target input item is acquired from the linked external data source (external service) so as to easily specify the dependency source input item. That is, as the dependency relationship between input items and the linkage (reference) between each input item and an external service (external data source) may be set, a candidate for the dependency source input item with regard to the input item may be dynamically acquired from the external service in a case where the dependency target input item is determined. In this case, the user may refrain from directly inputting the dependency source input item related to (associated with) the dependency target input item and may select and determine the dependency source input item from the candidates acquired from the external service. Thus, the user may easily acquire the data (document, etc.) related to the user.

With the information processing system 1a according to the present embodiment, for example, even a user who does not have a specialized knowledge, such as a programming language, or experience may generate and register a process flow (the process flow information 1100) so as to easily execute an application.

With the information processing system 1a according to the present embodiment, the user may use the device 20 to use various services provided by the application in which the process flow registered in the service provision system 10a is set.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

According to each of the above-described embodiments, when at least any of the functional units in the service provision system 10 (10a), the device 20, and the PC terminal 30 is implemented by executing a program, the program is provided by being previously installed in a ROM, or the like. The program executed by the service provision system 10 (10a), the device 20, and the PC terminal 30 according to each of the above-described embodiments may be provided by being recorded, in the form of file installable or executable, in a recording medium readable by a computer, such as a CD-ROM (compact disc read only memory), a flexible disk (FD), a CD-R (compact disk-recordable), a DVD (digital versatile disc), or an SD card. The program executed in the service provision system 10 (10a), the device 20, and the PC terminal 30 according to each of the above-described embodiments may be stored in a computer connected to a network, such as the Internet, and provided by being downloaded via the network. The program executed in the service provision system 10 (10a), the device 20, and the PC terminal 30 according to each of the above-described embodiments may be provided or distributed via a network such as the Internet. The program executed in the service provision system 10 (10a), the device 20, and the PC terminal 30 according to each of the above-described embodiments has a modular configuration including at least any of the above-described functional units and, in the actual hardware, the CPU reads and executes the program from the above-described storage device so that the above-described functional units are loaded and generated on the primary memory device.

The related art has such a drawback that, when an application is generated (developed) according to the related art, the list of items related to the item selected in a specific input field needs to be previously set. There is another drawback that as the list needs to be previously set, it is difficult to set the dependency relationship between items input to the input fields and to set the linkage between each input field and an external service when an application is generated (developed).

According to one or more embodiments of the present disclosure, an information processing system, an information processing apparatus, an information processing method, and a program are provided each allowing a candidate for a dependency source input item associated with a dependency target input item to be acquired from a linked external service, so as to easily specify the dependency source input item.

According to one or more embodiments of the present disclosure, the setting of dependency relationship between input items and the setting of linkage between each input field and an external service are configured.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system including a plurality of programs each executing a predetermined process, the information processing system comprising:
    a memory that stores
        an application for executing a series of processes, the application associating process flow information defining an execution order of one or more program of the plurality of programs with setting information setting a parameter used to execute to each of the one or more programs; and
        use screen information defining a use screen for using the application; and
    circuitry configured to
        receive a display request for the use screen from an electronic device;
        transmit, to the electronic device, the use screen information defining the use screen requested by the received display request and the setting information for the application corresponding to the use screen information, the setting information including a dependency setting indicating a dependency relationship between input items on the use screen, and a reference setting associating the input items with an external service;
        receive, from the electronic device, a first acquisition request that includes a first item value that is input to a first input item among the input items on the displayed use screen based on the transmitted use screen information, the first acquisition request requesting acquisition of a candidate for a second input item, the first acquisition request being automatically sent when the dependency relationship indicates that the second input item is a dependency source for which the first input item is set as a dependency target;
        acquire, from the external service, list information of the candidate for the second input item associated with the first item value included in the first acquisition request; and
        transmit the acquired list information to the electronic device to allow a particular candidate included in the list information to be selectable as the candidate for the second input item on the use screen displayed on the electronic device.

2. The information processing system according to claim 1, wherein the circuitry is further configured to:
    receive, from the electronic device, a second acquisition request for acquiring electronic data indicated by a second item value that is input to the second input item, when the second input item is not set as a dependency target for a different input item in the dependency setting of the setting information transmitted;
    acquire the electronic data requested by the second acquisition request from the external service; and
    transmit the acquired electronic data to the electronic device.

3. The information processing system according to claim 2, wherein the circuitry is further configured to execute a series of processes on the acquired electronic data in accordance with the execution order of the plurality of programs defined by the process flow information.

4. The information processing system according to claim 1, wherein the circuitry is further configured to:
    when a different item value changed from the first item value is input to the first input item after the circuitry transmits the list information of the candidate for the second input item to the electronic device, receive the first acquisition request including the different item value from the electronic device;
    acquire, from the external service, new list information of the candidate for the second input item associated with the different item value included in the first acquisition request; and
    transmit the acquired new list information associated with the different item value to the electronic device.

5. The information processing system according to claim 1, wherein the circuitry is further configured to register, in the memory, the process flow information including the execution order of the plurality of programs set in an information processing apparatus and the setting information including the dependency setting indicating the dependency relationship between t input items on the use screen, and the reference setting associating the input items with the external service and set in the information processing apparatus.

6. The information processing system according to claim 1, wherein in the setting information, the first input item and a third input item are set as a dependency target of the second input item, and
    wherein the circuitry is further configured to
        receive, from the electronic device, the first acquisition request including the first item value that is input to the first input item and a third item value that is input to the third input item, the first acquisition request requesting acquisition of the candidate for the second input item, which is the dependency source and for which the first input item and the third input item are set as the dependency target; and
        acquire, from the external service, the list information of the candidate for the second input item associated with the first item value and the third item value.

7. An information processing apparatus including a plurality of programs each executing a predetermined process, the information processing apparatus comprising:
    a memory that stores
        an application for executing a series of processes, the application associating process flow information defining an execution order of one or more programs of the plurality of programs with setting information setting a parameter used to execute each of the one or more programs of the plurality of programs; and
        use screen information defining a use screen for using the application; and
    circuitry configured to receive a display request for the use screen from an electronic device;

transmit, to the electronic device, the use screen information defining the use screen requested by the received display request and the setting information for the application corresponding to the use screen information, the setting information including a dependency setting indicating a dependency relationship between input items on the use screen, and a reference setting associating the input items with an external service;

receive, from the electronic device, a first acquisition request that includes a first item value that is input to a first input item among the input items on the displayed use screen based on the transmitted use screen information, the first acquisition request requesting acquisition of a candidate for a second input item, the first acquisition request being automatically sent when the dependency relationship indicates that the second input item is a dependency source for which the first input item is set as a dependency target;

acquire, from the external service, list information of the candidate for the second input item associated with the first item value included in the first acquisition request; and transmit the acquired list information to the electronic device to allow a particular candidate included in the list information to be selectable as the candidate for the second input item on the use screen displayed on the electronic device.

8. An information processing method performed by an information processing system including a plurality of programs each executing a predetermined process, the information processing system including:

a memory that stores
an application for executing a series of processes, the application associating process flow information defining an execution order of one or more programs of the plurality of programs with setting information setting a parameter used to execute each of the one or more programs of the plurality of programs; and use screen information defining a use screen for using the application, the information processing method comprising:

receiving a display request for the use screen from an electronic device;

transmitting, to the electronic device, the use screen information defining the use screen requested by the received display request and the setting information for the application corresponding to the use screen information, the setting information including a dependency setting indicating a dependency relationship between input items on the use screen, and a reference setting associating the input items with an external service;

receiving, from the electronic device, a first acquisition request that includes a first item value that is input to a first input item among the input items on the displayed use screen based on the transmitted use screen information, the first acquisition request requesting acquisition of a candidate for a second input item, the first acquisition request being automatically sent when the dependency relationship indicates that the second input item is a dependency source for which the first input item is set as a dependency target;

acquiring, from the external service, list information of the candidate for the second input item associated with the first item value included in the first acquisition request; and transmitting the acquired list information to the electronic device to allow a particular candidate included in the list information to be selectable as the candidate for the second input item on the use screen displayed on the electronic device.

9. The information processing system of claim 1, wherein the circuitry is further configured to repeat execution of the receive, acquire, and transmit steps when the setting information indicates a dependency relationship between the second input item and a third input item displayed on the use screen.

* * * * *